US008942207B2

(12) United States Patent
Son et al.

(10) Patent No.: US 8,942,207 B2
(45) Date of Patent: Jan. 27, 2015

(54) METHOD AND APPARATUS FOR SHORT HANDOVER LATENCY IN WIRELESS COMMUNICATION SYSTEM USING BEAM FORMING

(71) Applicant: Samsung Electronics Co., Ltd, Gyeonggi-do (KR)

(72) Inventors: Yeong-Moon Son, Gyeonggi-do (KR); Hyun-Jeong Kang, Seoul (KR); Kyung-Kyu Kim, Seoul (KR); Rakesh Taori, Dallas, TX (US); Young-Bin Chang, Gyeonggi-do (KR); Jung-Soo Jung, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 119 days.

(21) Appl. No.: 13/631,467

(22) Filed: Sep. 28, 2012

(65) Prior Publication Data

US 2013/0083774 A1  Apr. 4, 2013

(30) Foreign Application Priority Data

Sep. 29, 2011  (KR) .................. 10-2011-0098916

(51) Int. Cl.
*H04W 4/00* (2009.01)
*H04W 36/00* (2009.01)

(52) U.S. Cl.
CPC ...... *H04W 36/0055* (2013.01); *H04W 36/0083* (2013.01)
USPC ........................................ 370/331

(58) Field of Classification Search
USPC ............ 370/328–339, 350; 455/13.325, 63.4, 455/436–444, 562
See application file for complete search history.

(56) References Cited

U.S. PATENT DOCUMENTS

| 7,302,238 | B2 * | 11/2007 | Fujii ............................ 455/101 |
| 8,265,552 | B2 * | 9/2012 | Kamel et al. .................... 455/25 |
| 8,290,443 | B2 * | 10/2012 | Stirling-Gallacher et al. ......................... 455/67.13 |
| 2009/0196257 | A1 | 8/2009 | Kim et al. |

(Continued)

FOREIGN PATENT DOCUMENTS

| KR | 10-1999-0069960 | 9/1999 |
| KR | 10-2011-0016340 | 2/2011 |

OTHER PUBLICATIONS

International Search Report dated Mar. 28, 2013 in connection with International Patent Application No. PCT/KR2012/007962, 3 pages.

(Continued)

*Primary Examiner* — Frank Duong

(57) ABSTRACT

Beam selection is provided. A method for handover in a mobile station includes sending a scan request message for scanning a downlink (DL) beam with respect to a serving base station (BS) and a neighboring BS, to the serving BS, and receiving a scan response message; determining the DL beam for the MS by performing scanning with the serving BS and the neighboring BS based on the scan response message; sending a scan report message comprising a result of the scanning to the serving BS; when receiving an air-HO request message from the serving BS, generating an air-HO response message comprising information of a neighboring BS to which the MS hands over based on the air-HO request message; performing beam selection with the neighboring BS of the handover based on the air-HO request message; and performing the handover.

54 Claims, 10 Drawing Sheets

(56) References Cited

U.S. PATENT DOCUMENTS

| | | | |
|---|---|---|---|
| 2009/0231194 A1* | 9/2009 | Uno et al. | 342/367 |
| 2010/0172325 A1 | 7/2010 | Jung et al. | |
| 2010/0323749 A1 | 12/2010 | Lee et al. | |
| 2011/0064053 A1 | 3/2011 | Cha et al. | |
| 2011/0211490 A1* | 9/2011 | Nikula et al. | 370/252 |
| 2012/0320874 A1* | 12/2012 | Li et al. | 370/331 |

OTHER PUBLICATIONS

Written Opinion of the International Searching Authority dated Mar. 28, 2013 in connection with International Patent Application No. PCT/KR2012/007962, 4 pages.

* cited by examiner

METHOD AND APPARATUS FOR SHORT HANDOVER LATENCY IN WIRELESS COMMUNICATION SYSTEM USING BEAM FORMING

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Sep. 29, 2011, and assigned Serial No. 10-2011-0098916, the entire disclosure of which is hereby incorporated by reference.

TECHNICAL FIELD OF THE INVENTION

The present disclosure relates generally to a beamforming system. More particularly, the present disclosure relates to a method and an apparatus for improving handover latency matter due to beamforming used to support a wider coverage in a wireless communication system.

BACKGROUND OF THE INVENTION

The advent of smart phones exponentially increases user traffic, that is, data usage. Hence, users demand high data throughput more and more. This implies that a high bandwidth is required. For doing so, a high frequency needs to be used.

However, the higher frequency raises signal attenuation per distance. That is, when a center frequency over 30 GHz is used, base station coverage reduction caused by the signal attenuation is inevitable. The coverage reduction requires more beam use, which increases latency. Thus, a method and an apparatus for enhancing the latency are needed.

SUMMARY OF THE INVENTION

To address the above-discussed deficiencies of the prior art, it is a primary aspect of the present disclosure to provide a method and an apparatus for short handover latency in a wireless communication system using beamforming.

Another aspect of the present disclosure is to provide a method and an apparatus for conducting beam selection in a scanning interval in advance in a wireless communication system using beamforming.

Yet another aspect of the present disclosure is to provide a method and an apparatus for minimizing handover latency increase in beam selection by omitting the beam selection in handover using downlink/uplink link beam information pre-stored.

According to one aspect of the present disclosure, a method for handover in a Mobile Station (MS) of a wireless communication system which adjusts a beam direction includes sending a Scan_Request message for scanning the best DownLink (DL) beam or the best DL beam and UpLink (UL) beam with respect to a serving Base Station (BS) and a neighboring BS, to the serving BS, and receiving a Scan_Response message; determining the best DL beam or the best DL beam and UL beam for the MS by performing Scanning or the Scanning and Association with the serving BS and the neighboring BS based on the Scan_Response message; sending a Scan_Report message comprising a result of the Scanning or the Scanning and the Association to the serving BS; when receiving an Air-HO_Request message from the serving BS, generating an Air-HO_Response message comprising information of a neighboring BS to which the MS hands over, based on the Air-HO_Request message; performing beam selection with the neighboring BS of the handover based on the Air-HO_Request message; and performing handover, and transmitting and receiving data to and from the neighboring BS of the handover.

According to another aspect of the present disclosure, a method for handover in a serving BS of a wireless communication system which adjusts a beam direction includes receiving a Scan_Request message for scanning the best DL beam or the best DL beam and UL beam for an MS, from the MS, receiving a Dedicated Ranging Code of the MS from a neighboring BS through negotiation with the neighboring BS, and sending a Scan_Response message comprising information about whether to perform Scanning or the Scanning and Association, to the MS; receiving from the MS a Scan_Report message comprising information of the best DL beam or the best DL beam and UL beam for the MS and a result of the Scanning or the Scanning and the Association; sending a NW-HO_Request message to at least one neighboring BS based on the Scan_Response message in order to identify a BS capable of supporting handover of the MS and to share context of the MS; receiving a NW-HO_Response message comprising information indicating whether the handover of the MS is supportable, from the at least one neighboring BS; sending an Air-HO_Request message to the MS based on the NW-HO_Response message, and receiving an Air-HO_Response message comprising information indicating whether the MS is able to hand over and information of at least one neighboring BS to which the MS hands over; and sending a NW-HO_Confirm message informing whether the handover of the MS is performed, to the neighboring BS which sends the NW-HO_Request message based on the Air-HO_Response message.

According to yet another aspect of the present disclosure, a method for handover in a neighboring BS of a wireless communication system which adjusts a beam direction includes sending a Dedicated Ranging Code of an MS to a serving BS through negotiation with the serving BS, and performing Association with the MS to scan the best DL beam or the best DL beam and UL beam for the MS; receiving from the serving BS a NW-HO_Request message based on a Scan_Response message comprising a result of Scanning or the Scanning and Association of the MS in order to identify a BS capable of supporting handover of the MS and to share context of the MS; generating and sending a NW-HO_Response message comprising information indicating whether the handover of the MS is supportable, to the serving BS; receiving from the serving BS a NW-HO_Confirm message informing whether the handover of the MS is performed, to the neighboring BS which sends the NW-HO_Request message based on the Air-HO_Response message; performing beam selection with the MS based on the NW-HO_Confirm message; and transmitting and receiving data to and from the MS which hands over.

According to still another aspect of the present disclosure, an apparatus of an MS for handover in a wireless communication system which adjusts a beam direction includes a receiver for receiving at least one reference signal from a BS in at least one DL Tx beam direction; a transmitter for sending a ranging signal to the BS in at least one UL Tx beam direction; a channel estimator for estimating a channel according to the at least one DL Tx beam direction using the at least one reference signal; and a controller for selecting best DL and UL beams between the BS and the MS by considering channel information according to the at least one DL Tx beam direction, and controlling to send and receive messages to and from the BS.

According to a further aspect of the present disclosure, an apparatus of a serving BS for handover in a wireless communication system which adjusts a beam direction includes at least one antenna comprising a plurality of antenna elements; a transmitter for sending at least one reference signal in at least one DL Tx beam direction; a receiver for receiving channel information according to at least one UL Tx beam direction from an MS; a controller for selecting the UL Tx beam direction by considering the channel information according to at least one UL Tx beam direction received from the MS through the receiver, selecting best DL beam and UL beam between the MS and the serving BS by sending and receiving messages for the MS in consideration of the selected UL Tx beam direction, and providing information for handover to the MS; and a plurality of Radio Frequency (RF) paths connected to the respective antenna elements, and forming a beam to send a signal to the MS according to the DL Tx beam direction selected by the controller.

According to a further aspect of the present disclosure, an apparatus of a neighboring BS for handover in a wireless communication system which adjusts a beam direction includes at least one antenna comprising a plurality of antenna elements; a transmitter for sending at least one reference signal in at least one DL Tx beam direction; a receiver for receiving channel information according to at least one UL Tx beam direction from an MS; a controller for selecting the UL Tx beam direction by considering the channel information according to at least one UL Tx beam direction received from the MS through the receiver, selecting best DL beam and UL beam between the MS and the serving BS by sending and receiving messages for the MS in consideration of the selected UL Tx beam direction, and providing information for handover to the serving BS; and a plurality of RF paths connected to the respective antenna elements, and forming a beam to send a signal to the MS according to the DL Tx beam direction selected by the controller.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present disclosure relates to a method and an apparatus for enhancing handover latency increase which can result from beamforming used to support a wider coverage in a millimeter wave wireless communication system using a high frequency over 30 GHz.

Exemplary embodiments of the present disclosure provide a method and an apparatus for short handover latency in a wireless communication system using beamforming.

Figure 1:
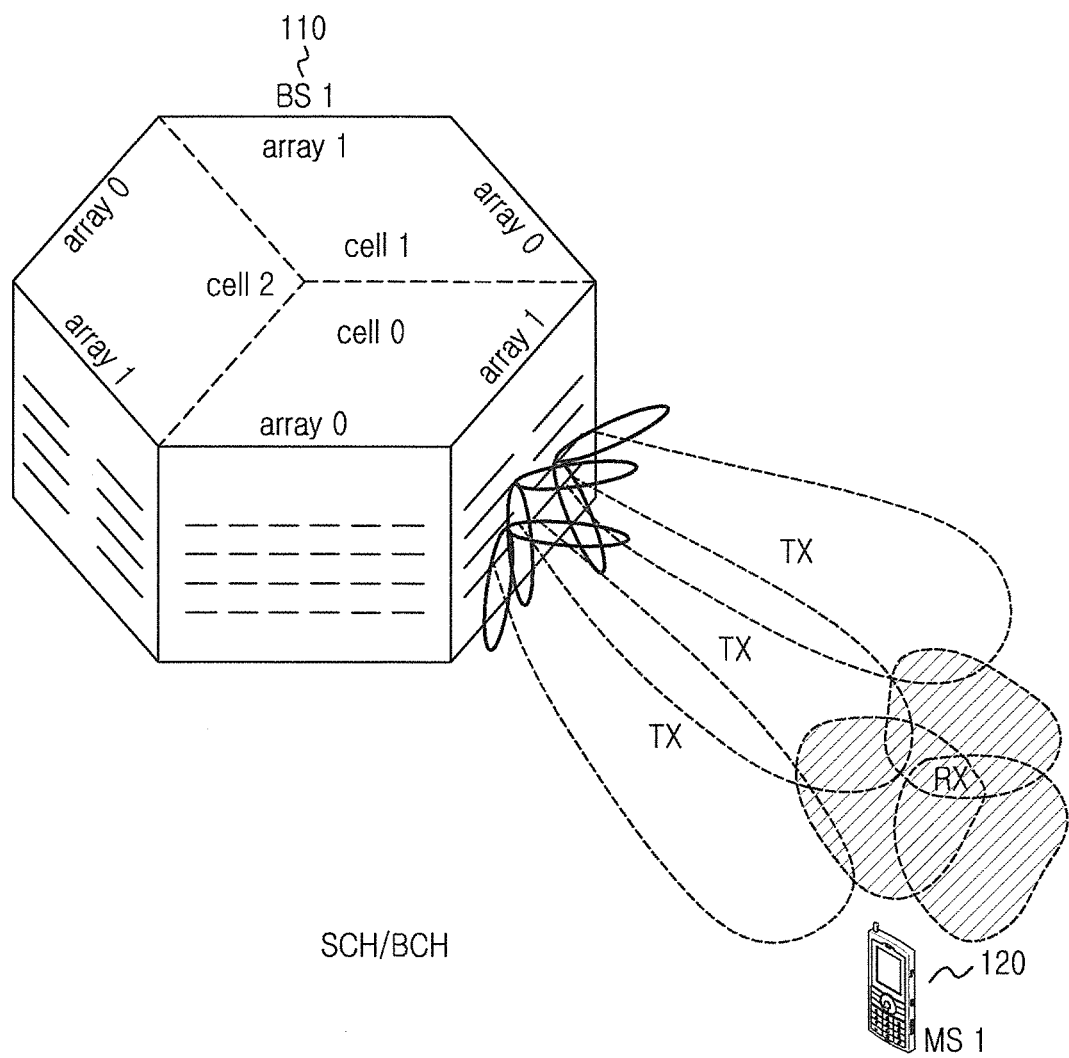
FIG. 1 illustrates downlink beam transmission and reception according to an exemplary embodiment of the present disclosure.

FIG. 1 depicts DownLink (DL) beam transmission and reception according to an exemplary embodiment of the present disclosure.

Referring to FIG. 1, in the DL, a Base Station (BS) 110 transmits data (including a broadcast message) by changing a DL Tx beam direction using an array antenna. Next, a Mobile Station (MS) 120 receives the data by changing an Rx beam direction.

To attain maximum data throughput between the BS 110 and the MS 120, the DL Tx beam of the BS 110 should face the MS 120 and an active array antenna for the DL Rx beam of the MS 120 should also face the BS 110.

Figure 2:
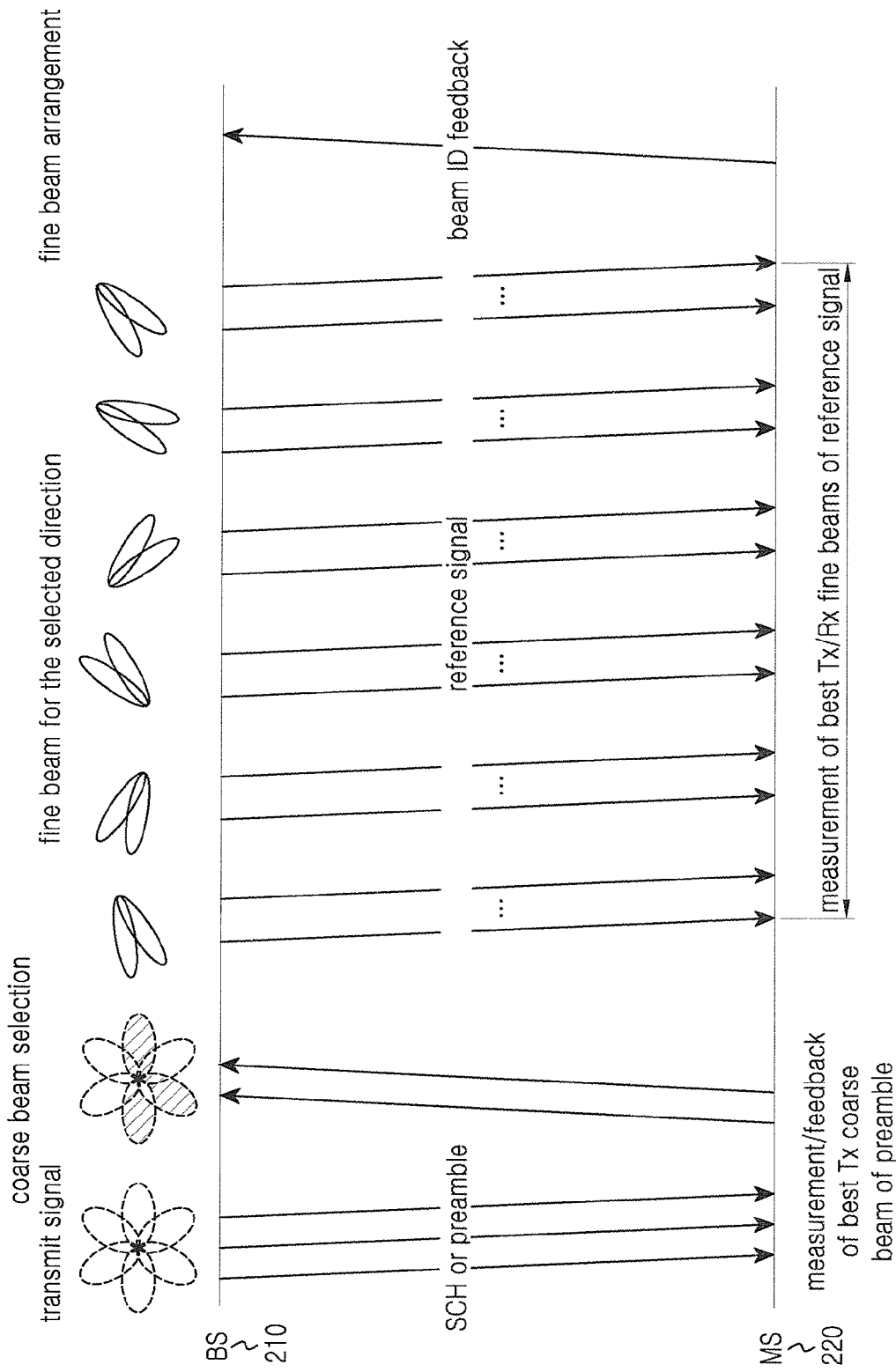
FIG. 2 illustrates coarse beam and fine beam selection according to an exemplary embodiment of the present disclosure.

FIG. 2 depicts coarse beam and fine beam selection according to an exemplary embodiment of the present disclosure.

Referring to FIG. 2, an MS 220 sets a direction for the DL Rx beam and then attempts to receive DL Tx beams of a BS 210. Herein, the MS 220 can receive a preamble over a Synch CHannel (SCH). The preamble includes a beam ID. Alternatively, the beam ID can be contained in a Broadcast CHannel (BCH) following the SCH, and a message in the BCH is carried by over the DL Tx beam such as the SCH, as in the transmission over the SCH. Frame structure may be different based on design philosophy.

The MS 220 repeats this process by changing the DL Rx beam. Next, the MS 220 determines which DL Tx beam of the BS 210 has the greatest signal strength.

Next, the MS 220 notifies a beam ID of the DL Tx beam of the greatest signal strength to the BS 210, in a ranging procedure to be explained.

As such, the MS 220 and the BS 210 determine the DL Tx/Rx beams to use and finish DL data transmission/reception preparation. This can be referred to as a beamforming basic procedure, and coarse beam selection.

For coverage expansion and reliable data transmission in view of optimization, additional beamforming can be carried out. That is, a narrower beam than the beam width used in the coarse beam selection can be selected, which is referred to as fine beam selection.

Unlike the wide beam used in the SCH/BCH, a reference signal (e.g., a preamble), a midamble, or a corresponding signal from the BS 210 is used, and the reference signal includes a fine (or narrow) beam ID.

The reference signal is transmitted from the BS 210 to the MS 220 over the DL fine (or narrow) Tx beams. The MS 220 receives the signal by changing the direction of the DL Rx beams with respect to the DL fine (or narrow) Tx beams of the BS 210, measures a channel, and then determines the direction of the DL fine (or narrow) Rx beam. This process is repeated as many times as the DL fine (or narrow) Rx beams of the MS 220. In other words, the selection of the BS fine (or narrow) beam and the MS wide or fine (or narrow) beam in the DL can be the fine beam selection.

Through the fine beam selection, the MS 220 can identify the DL fine (or narrow) Rx beam of the coarse beam selection and the DL fine (or narrow) Tx beam of the greatest signal strength.

Next, the MS 220 informs the BS 210 of the DL fine (or narrow) Tx beam (the DL fine (or narrow) Tx beam to be used by the BS 210 to transmit data to the MS 220).

Figure 3:
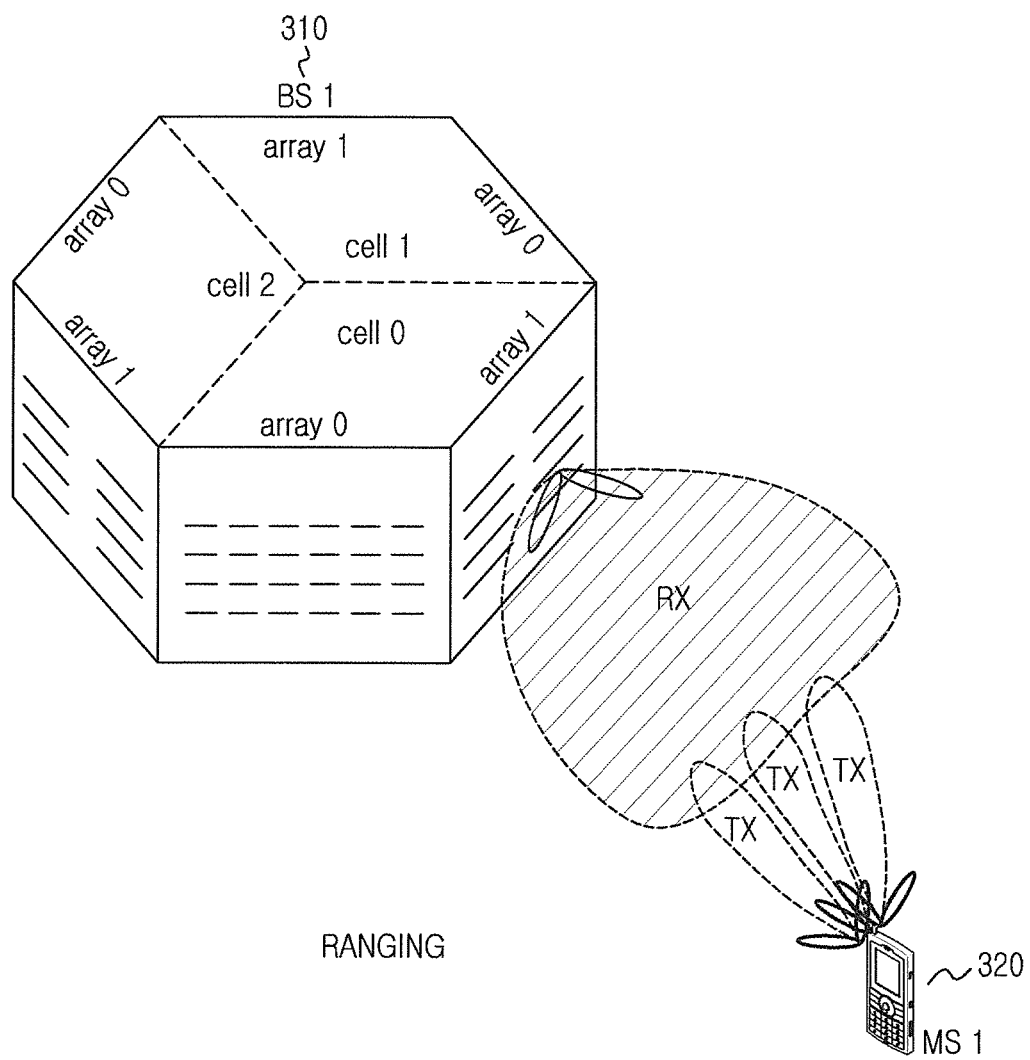
FIG. 3 illustrates uplink beam transmission and reception according to an exemplary embodiment of the present disclosure.

FIG. 3 depicts UpLink (UL) beam transmission and reception according to an exemplary embodiment of the present disclosure.

Referring to FIG. 3, the UL also requires the beam selection as in the DL. Such beam selection is similar to the DL coarse beam selection but the beam is selected in a ranging procedure of an MS 320, rather than the SCH/BCH.

That is, the MS 320 sends a ranging code over the UL Tx beam, and the ranging code includes the DL Tx beam ID (the DL Tx beam of the BS having the greatest signal strength identified/selected through the MS coarse beam selection in the DL) as in the coarse beam selection. This implies the signal strength of the best TX beam of the BS represents the signal strength of the BS. In case of omni-directional antenna system, only one signal strength from the BS is measured. But. For Beam Forming System, multiple beams from one BS exist and the MS will measure the signal strength of each beam. Eventually, one best beam of BS represents the signal of the BS like the case of BS having omni-directional antenna (i.e. a sort of single beam). The ranging code also includes the UL Tx beam ID so that the BS can identify the UL Tx beam including the ranging code received from the MS. The MS 320 sends the ranging code by changing the UL Tx beam. This process is repeated multiple times as many as the UL Rx beams of the BS 310. FIG. 3 depicts the single UL Rx beam by way of example. When the BS includes a plurality of UL Rx beams, the BS 310 can repeatedly receive the UL Rx beam of the MS by changing the UL Rx beams and then determine which UL Tx beam of the MS 320 has the greatest signal strength.

To notify the UL Tx beam to be used by the MS 320 to transmit data, the BS 310 sends a message such as RNG-ACK to the MS 320.

Hence, the MS 320 finishes the UL data transmission and reception preparation with the BS 310. Notably, the fine beam selection can be performed as in the DL. However, since the fine (or narrow) beam generation in the compact MS generally consumes great power and increases implementation complexity, the wide beam is mostly used.

Since the MS 320 is mostly mobile, the direction change of the DL Tx beam/UL Rx beam of the BS 310 and the DL Rx beam/UL Tx beam of the MS 320 is inevitable. For doing so, the MS 320 and the BS 310 need to periodically change the beam in order to find the best beam for each other, which is referred to as beam tracking.

Through the beamforming as stated above, the coverage improvement (expansion) and the more reliable data transmission are possible. However, to initiate the data communication after physical synchronization with one BS, the MS and the BS require the beam selection, which can increase latency. While the latency in the beam selection is not a considerable problem in initial network entry, the long handover latency caused by the beam selection during the handover can be burdensome.

Figure 4:
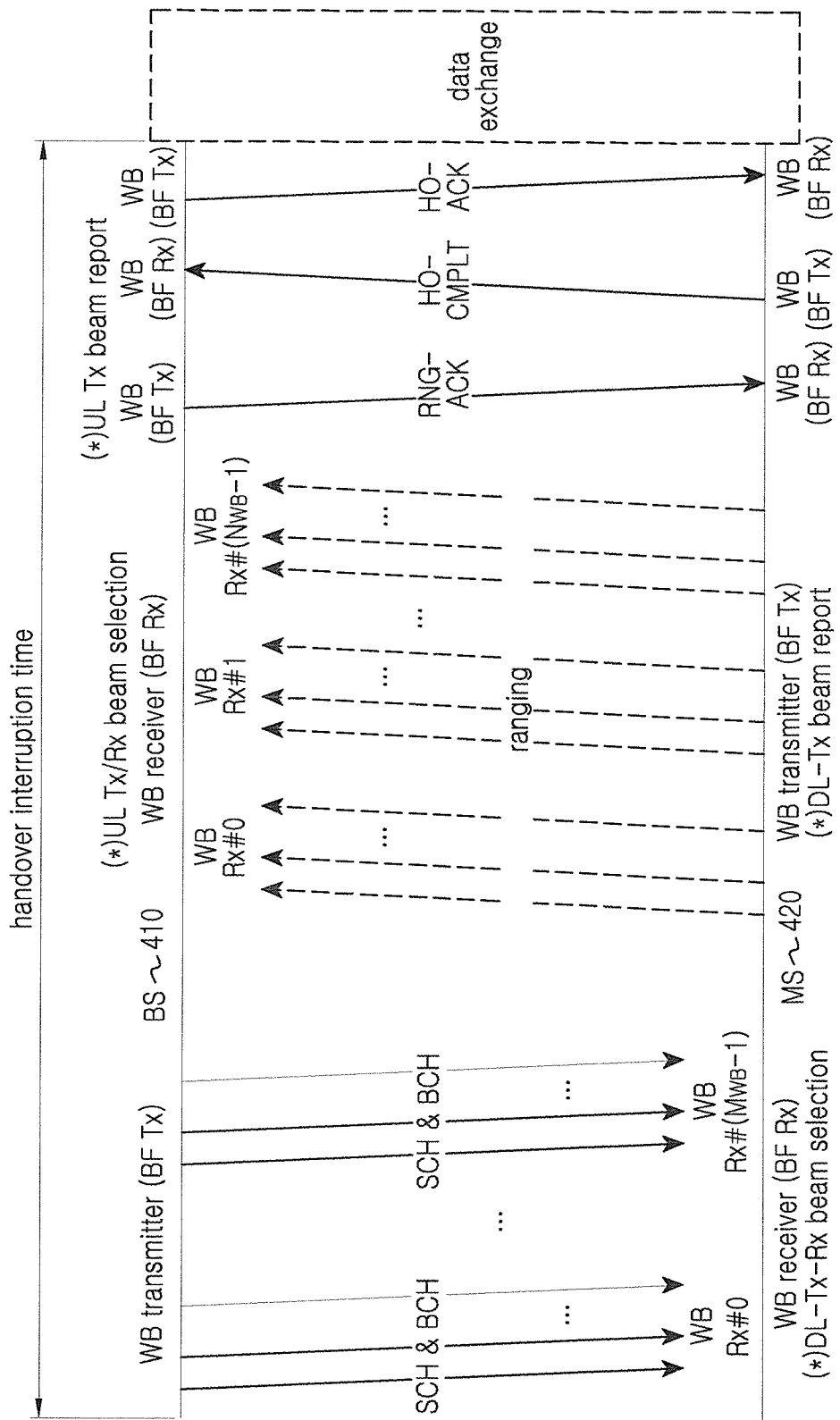
FIG. 4 illustrates a handover delay time according to an exemplary embodiment of the present disclosure.

FIG. 4 depicts a handover delay time according to an exemplary embodiment of the present disclosure.

Referring to FIG. 4, an MS 420 performs the beam selection for the DL reception. A BS 410 sends its preamble over the SCH. To receive the preamble, the MS 420 seeks the beam receiving the preamble of the greatest signal power level by changing the Rx beam. In FIG. 4, WB denotes the wide beam.

This process requires an additional time as long as M×N (M: the total time required to receive all of the DL Tx beams of the BS 410 over one DL Rx beam of the MS, N: the number of the DL Rx beams), and directly affects the handover latency.

When the MS 420 performs the ranging, the MS 420 sends the ranging code by changing the UL Tx beam. Such UL Tx beam transmission is repeated as many times as the number of the UL Rx beams of the BS 410. That is, an additional time as long as M'×N' (M': the time required for the MS to receive all of the UL Tx beams of the MS over one UL Rx beam, N': the number of the UL Rx beams of the BS) is required. Such a time can directly affect the handover latency.

Figure 5:
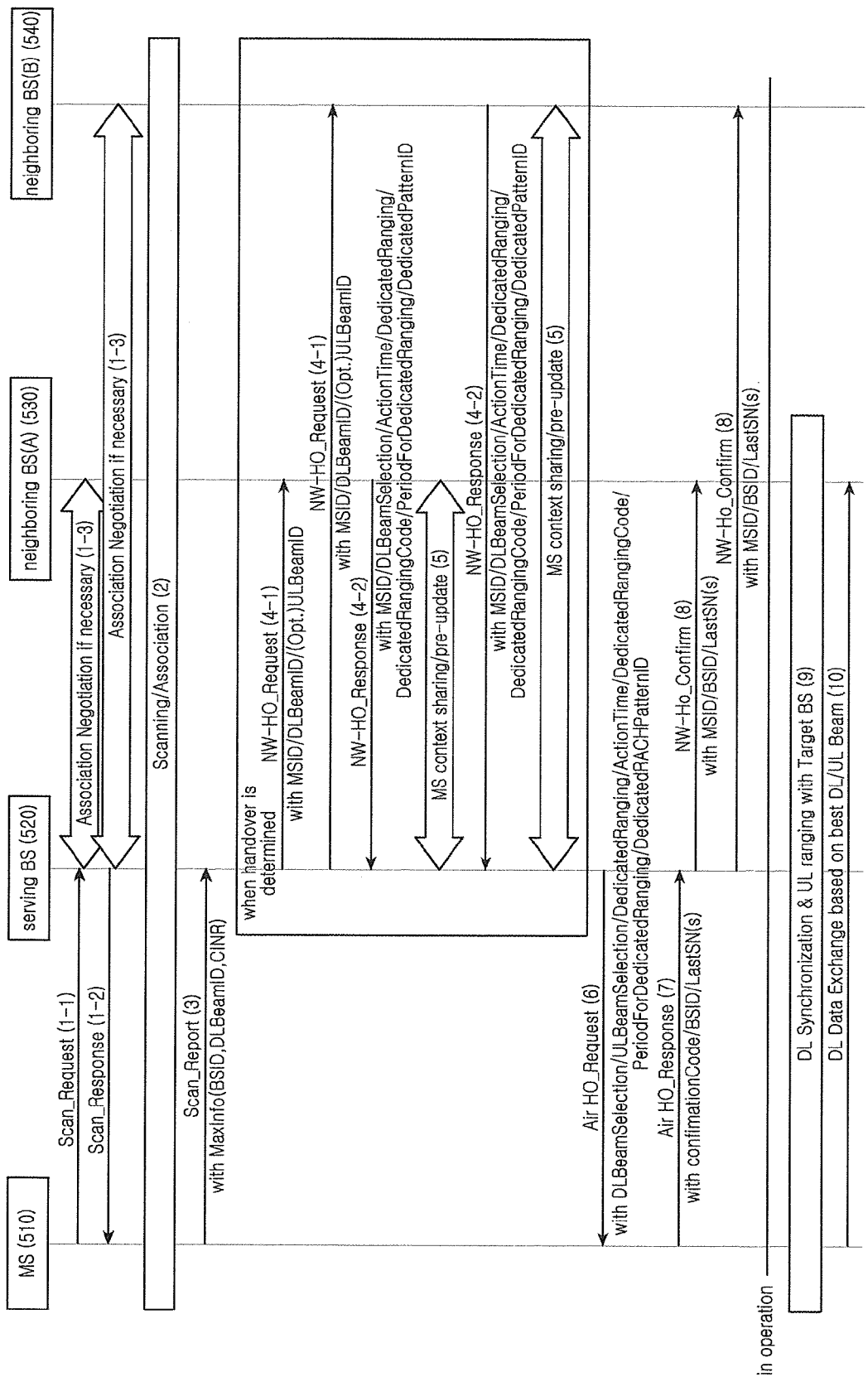
FIG. 5 illustrates message flows of the handover according to an exemplary embodiment of the present disclosure.

FIG. 5 illustrates a message flow diagram of the handover according to an exemplary embodiment of the present disclosure.

Referring to FIG. 5, for the handover of an MS 510, a serving BS 520 and neighboring BSs 530 and 540 should measure the channel. The channel measurement is referred to as scanning. For the scanning, the MS 510 and the serving BS 520 need control message transaction.

For example, the scanning is fulfilled through Scan_Request/Scan_Response message transaction (steps 1-1 and 1-2). How to conduct Scanning/Association, to be explained, is determined in the Scan_Request/Scan_Response message transaction.

Parameters of the Scan_Request/Scan_Response messages are as follows.

Scanning Type indicates a scanning type and classified into two types of Scanning only (0), and Scanning and Association (1). The Scanning only (0) indicates only the scanning performed, and the Scanning and Association (1) indicates both of the Scanning and the Association performed (step 1-3).

Scanning iteration indicates how many times the scanning is repeated; that is, how many times (scanning duration+interleaving interval) is iterated.

Scanning duration indicates a duration when the MS 510 scans (selects the coarse beam and measures the channel) the serving BS 520 and the neighboring BSs 530 and 540. When the BS (e.g., the serving BS 520) determines that the communication with the MS is infeasible in this duration, and thus does not transmit the data to the MS 510.

Scanning interleaving interval is an interval between the Scanning duration and the Scanning duration, where the BS (e.g., the serving BS 520) and the MS 510 can communicate. In this interval, the MS 510 reports the scanning result to the BS (e.g., the serving BS 520).

Scanning metric indicates a measurement metric, and is used to set Received Signal Strength Indication (RSSI), Carrier to Interference-and-Noise Ratio (CINR), and RTD.

Scanning Report Type is used to determine a method for reporting the measurement result to the BS. Periodic Reporting or Event-driven Reporting can be set. the Periodic Reporting indicates periodic report, and the Event-driven Reporting indicates report when an event occurs.

Report Period is an additional period required when the Scanning Reporting Type indicates the Periodic Reporting, that is, indicates the period for the MS 510 to transmit the channel measurement result to the BS 520. Herein, various units can be used. For example, the time or a frame number can be used. Herein, the number of Scanning Listening Intervals can be used. That is, when the value is 5, the MS 510 needs to report the measurement result of at least one Scanning Duration to the MS 520 in every fifth Scanning Listening Interval.

Report Condition is a parameter included when the Scanning Reporting Type is the Event-driven Reporting. The MS 510 obtains the Report Condition using information (Report Condition) relating to the Event-driven Reporting broadcast by the serving BS 520 or using Report Condition information of the Scan_Response. When the channel measurement result satisfies the Report Condition (e.g., a CINR difference between the neighboring BSs 530 and 540 and the serving BS 520 is greater than 3 dB), the MS 510 can send the Scanning Report to the BS 520 during a random Scanning Interleaving Interval. In some implementations, the Scanning Report can be transmitted in the Scanning Duration.

BSID is used to designate the BS to scan.

Dedicated Ranging Code indicates a Dedicated Ranging Code to be used by the MS 510 in the corresponding BS having a particular BSID in the process of the Association.

Dedicated Ranging Opportunity is used to indicate Dedicated Ranging Opportunity of the MS 510 for the MS 510 to transmit the Dedicated Ranging Code, and includes location information and size information.

Period for Dedicated Ranging Code indicates a valid time of the Dedicated Ranging Code of the MS 510 transmitted in the corresponding BS in the process of the Association, and functions as a timer. That is, when the Period for Dedicated Ranging Code expires, the MS cannot use the corresponding Dedicated Ranging Code. The unit of the Period for Dedicated Ranging Code may use second/millisecond of the time, and may indicate a particular frame for ending the Dedicated Ranging Code using Least Significant Bits of the Frame Number.

Through the Scan_Request/Scan_Response message transaction including those parameters, the BS or the MS determines which operation is performed by the MS 510 for the BS 520 in the scanning interval. For example, the BS or the MS determines whether to conduct Scanning Only or Both Scanning and Association.

The Scanning is explained as below (step 2).

The MS 510 fundamentally measures the channel of the DL of the BS 520. Since the beamforming is applied, the coarse beam selection is performed between the MS 510 and the BS 520 and the MS 510 measures each DL Tx beam of the BS 520. In so doing, the metric used can be either the RSSI or the CINR. The MS 510 stores the ID and the measurement result of the DL Tx beam (e.g., DL beam ID and measurement result) of the best signal strength among the measurement results of the DL Tx beams. During Scanning procedure, the fine beam selection may be performed between the MS 510 and the BS 520. In that case, A. the MS performs the coarse beam selection first to find the best 'x' BSs (i.e. X=the number of candidate BSs which has the best signal strength). Therefore, the MS repeats coarse beam selection with neighbor BSs, and it selects the best 'x' BSs out of all BSs with which the MS performed coarse beam selection. The MS performs fine beam selection procedure with the chosen 'x' BSs. Actually, it takes longer time to do fine beam selection because the number of fine beams is larger than the number of wide beams. So reducing the number of BSs to do fine beam selection with. When the MS sends measurement result to the serving BS after scanning+ (optional) association procedure, the MS can include measurement result of either all BSs or the best 'y' BSs for bine beam B. Unlike A), the MS can directly perform fine beam selection without $1^{st}$ step (i.e. selecting 'x' BS by coarse beam selection). Remaining operation is the same as A).

Alternatively, the MS may perform all neighbor BSs without filtering out BSs having weaker signal strength.

The Association is described as below (step 2).

The Association performs the ranging between the MS 510 and the BS 520 and the UL coarse beam selection between the MS 510 and the BS 520. When the scanning is performed, the Association can be conducted selectively or additionally between the MS 510 and the BS 520. The MS can also perform association procedure with only the above mentioned 'x' or 'y' candidate BS. Or, the MS can perform association procedure with the all neighbor BS.

When the Association is activated, the MS 510 can obtain the Dedicated Ranging Code to be used per BS using the Scan_Response message. When scanning the corresponding BS, the MS 510 additionally sends the Dedicated Ranging Code to the corresponding BS. The Ranging Opportunity used may be Contention-based Common Ranging Opportunity available to every MS for sending the ranging code.

When the Ranging Opportunity is separately set in the Scanning Response, it indicates the Dedicated Ranging Code allocated to the corresponding MS and the dedicated ranging code can be transmitted using the region. The Dedicated Ranging Code includes the best DL Tx beam ID of the BS. Hence, the BS 520 can identify the DL Tx beam to use to send the response to the MS 510.

The neighboring BSs 530 and 540 can identify the MS which performs the Association based on the Dedicated Ranging Code (the Scan_Request/Scan_Response message can be negotiated between the serving BS 520 and the neighboring BSs 530 and 540, which can indicate the Ranging Code allocated by the neighboring BSs 530 and 540 to the MS 510).

Through the ranging (a sort of the UL coarse beam selection) with the MS 510, the BS 520 can obtain the best UL Tx beam of the MS 510 and its best UL Rx beam used at this time.

The BS 520 needs to inform the MS 510 of the best UL Tx beam. For doing so, several methods can be used. For example, after completing the ranging of the MS 510, the BS 520 can send an RNG-ACK including the UL beam ID of the best UL beam.

In summary, the MS 510 can obtain the DL Tx beam/DL Rx beam of the BS 20 through the scanning and obtain the UL Tx beam/UL Rx beam through the Association.

In the Scanning Interleaving Interval, the MS 510 can report the Scanning/Association results of the Scanning Duration to the serving BS 520. The report can use the Periodic Reporting or the Event-driven Reporting. When the MS reports measurement result, the report message can include the measurement result(s) of one BS or more than one BS.

Based on the information, the serving BS 520 can determine handover of the MS 510. That is, using the report (Scan_Report, step 3) of the MS 510, when determining that the MS 510 requires the handover, the serving BS 520 determine whether to perform the handover by negotiating with the corresponding BSs about the handover of the corresponding MS based on the BS measurement information contained in the Scan_Report message of the MS 510.

Upon determining the handover, a NW-HO_Request message (step 4-1) and a NW-HO_Response message (step 4-2) are transmitted and received between the serving BS 520 and the neighboring BSs 530 and 540, and the messages carry the information of the MS.

When the serving BS 520 and the neighboring BSs 530 and 540 negotiate about the handover, the NW-HO_Request message includes at least the following parameters.

MSID indicates the ID of the MS to hand over.

DL Beam ID is used to indicate the DL Tx beam to be used by the corresponding neighboring BS to transmit data to the MS after the handover (Network Re-Entry procedure) of the MS is completed. The DL Beam ID indicates the ID of the DL Tx beam of the greatest signal strength determined by the MS during the scanning of the corresponding BS.

UL Beam ID is used to indicate the UL Rx beam to be used by the corresponding neighboring BS to receive data from the MS after the handover (Network Re-Entry procedure) of the MS is completed. This parameter can be included only when the MS performs the Association.

The neighboring BSs 530 and 540 receiving the NW-HO_Request message respond to the serving BS 520 with a NW-HO_Response message. The NW-HO_Response message includes at least the following parameters.

MSID indicates the ID of the MS to hand over. DL Beam Selection is a parameter used to indicate whether the MS applies or omits DL Beam Selection with respect to the corresponding neighboring BS. If time elapsed by HO procedure is expected to be longer than coherence time (the time duration over which the channel impulse response is considered to be not varying), this DL Beam Selection will be set to 1. By other purpose, this DL Beam Selection may be set to 0 or 1. The elapsed time implies time between a) sending report measurement message to the serving BS and b) action time when the MS attaches to target BS.

UL Beam Selection indicates whether to perform UL Beam Selection when the MS performs the Network Re-Entry to the corresponding neighboring BS, that is, indicates that the MS needs to perform the ranging (the ranging including the UL beam selection). The ranging can be Dedicated Ranging or Normal Ranging. The UL Beam Selection of 0 signifies that the MS does not need the UL Beam Selection. This implies that the MS obtains the best UL Tx beam through the Association (in connection with the UL beam ID). That is, when the MS sends the Scan_Report including the UL beam ID, it is reflected to the NW-HO_Request and reported to the neighboring BS. Based on this, the neighboring BS, upon determining that the UL beam selection of the MS is unnecessary, sets the corresponding parameter to zero. Even though the MS has performed UL beam selection through the association procedure, if time elapsed by HO procedure is expected to longer than coherence time, this UL Beam Selection will be set to 1. By other purpose, this UL Beam Selection may be set to 0 or 1.

When the Dedicated Ranging is set to 1, Action Time is used to notify the time for using the Dedicated Ranging Code. That is, the Action Time is used to indicate the time for initiating Network Entry with the corresponding BS, and the unit can be expressed as the time or the frame number. Meanwhile, when the DL Beam Selection=0 and the UL Beam Selection=0, the Action Time indicates the actual data transmission and reception time.

When the UL Beam Selection=1, Dedicated Ranging is used for the corresponding neighboring BS to allocate the Dedicated Ranging Code or the Dedicated Ranging Opportunity for the fast handover of the MS. In this case, the parameter Dedicated Ranging is set to 1. When the UL Beam Selection=1 and the Dedicated Ranging=0, the MS randomly selects the Ranging Code and performs the normal ranging because the Dedicated Ranging Code is not separately allocated. When the UL Beam Selection=0, the MS omits the ranging with the neighboring Bs and thus this parameter can be omitted.

The Dedicated Ranging Code is included when the Dedicated Ranging=1 (with UL Beam Selection=1). This parameter indicates the ranging code to be used by the MS in the ranging. The BS recognizes the corresponding MS based on the allocated ranging code.

Period for Dedicated Ranging Code is included when the Dedicated Ranging is set to 1. That is, when the MS performs the handover (the Network Re-Entry) to the corresponding BS, the parameter indicates the valid time of the Dedicated Ranging Code to be used by the MS. When this time passes, the corresponding Dedicated Ranging Code may be allocated to other MS and accordingly the MS may not use the Dedicated Ranging Code any more. Finally, when this time passes, the MS randomly selects the Ranging Code and performs the Network Re-Entry.

Dedicated RACH Pattern ID is included when the Dedicated Ranging=1, and indicates a scheduling pattern index of the Dedicated RACH (Ranging Opportunity) allocated by the BS to the corresponding MS. Using the index, when and where the Dedicated Ranging Opportunity is located can be obtained. That is, the pattern of Time offset/Opportunity location/number/allocation period from the Action Time to the first Ranging Opportunity can be obtained from the index.

Through the NW-HO_Request/Response message transmission and reception (steps 4-1 and 4-2), context sharing/update of the MS 510 is completed between the corresponding serving BS 520 and the neighboring BSs 530 and 540 (step 5).

Through the handover negotiation with the neighboring BSs 530 and 540, the serving BS 520 can identify the neighboring BSs 530 and 540 for processing the handover of the corresponding MS 510 and transacts the handover messages with the MS 510.

Next, the serving BS 520 sends an Air-HO_Request message to the MS 520 (step 6). The Air-HO_Request message includes at least the following parameters.

BSID(s) indicates the ID of the BS to which the MS hands over. A plurality of the BSIDs can exist.

DL Beam Selection is the same as the DL Beam Selection of the NW-HO_Response.

UL Beam Selection is the same as the UL Beam Selection of the NW-HO_Response.

Dedicated Ranging is the same as the Dedicated Ranging of the NW-HO_Response.

Action Time is the same as the Action Time of the NW-HO_Response.

Dedicated Ranging Code is the same as the Dedicated Ranging Code of the NW-HO_Response.

Period for Dedicated Ranging Code is the same as the Period for Dedicated Ranging Code of the NW-HO_Response.

Dedicated RACH Pattern ID is the same as the Dedicated RACH Pattern ID of the NW-HO_Response.

The MS 510 receiving the Air-HO_Request message sends an Air-HO_Response message to the serving BS 520 in response (step 7).

The Air-HO_Response message includes at least the following parameters.

Confirmation Code indicates whether the MS permits the handover request of the Air-HO_Request of the BS. That is, when the MS can hand over, the Confirmation Code is set to zero. When the MS cannot hand over, the Confirmation Code is set to 1.

BSID(s) indicates the ID of the BS determining the handover of the MS when the Confirmation Code is zero, that is, when the handover is performed.

Last SN(s) indicates Sequence Number of the last packet successfully used (transmitted) per service flow of the MS. This parameter exists as many as the service flows of the MS.

When the Confirmation Code of the Air-HO_Response message is zero, the serving BS 520 receiving the Air-HO_Response from the MS 510 sends a NW-HO_Confirm message to the neighboring BSs 530 and 540 which determine to support the handover of the MS 510 among the neighboring BSs 530 and 540 negotiated about the handover of the corresponding MS (step 8). The NW-HO_Confirm message includes at least the following messages.

MSID indicates the ID of the MS.

BSID indicates the ID of the BS determining the handover of the MS.

Last SN(s) is the same as the Last SN(s) of the Air-HO_Response message.

Of the neighboring BSs 530 and 540 receiving the NW-HO_Confirm message, the neighboring BS 540 without the corresponding BSID can release the resource reserved for the corresponding MS 510 because there is no need to maintain the resource. Since the neighboring BS 530 having the corresponding BSID determines the handover of the MS 510, it maintains the reserved resources and prepares the handover (the Network Re-Entry) of the MS 510.

The corresponding neighboring BS 530 having the BSID of the NW-HO_Confirm message conduct the beam selection with the MS from the frame indicated by the negotiated Action Time (step 9) or initiates the actual DL data transmission (step 10). The operation of the MS differs according to the negotiated parameter.

When the DL Beam Selection=0 and the UL Beam Selection=0 in the Air-HO_Request message, this implies that the MS 510 does not need the Beam Selection in the DL/UL. The MS transmits and receives data using the corresponding beam from the frame indicated by the Action Time using the DL Rx beam (the BS uses the corresponding DL Tx beam based on the DL Beam ID) and the UL Tx beam (the BS uses the corresponding UL Rx beam based on the UL Beam ID) obtained through the Scanning/Association. That is, the beam selection is not conducted separately and thus the handover latency can be prevented.

When the DL Beam Selection=0 and the UL Beam Selection=1, this implies that the MS does not need the DL Beam Selection with the corresponding neighboring BS. The UL Beam Selection=1 signifies that the MS does not perform the Association and requests the UL Beam Selection. When the Dedicated Ranging=1, the corresponding neighboring BSs 530 and 540 allocate the dedicated resource (Dedicated Ranging Code/Dedicated Ranging Opportunity) to the MS 510 and the MS 510 performs the ranging (and the UL beam selection at the same time) using the resource.

When the Dedicated Ranging=0, the BS does not allocate the dedicated resource to the MS 510 and accordingly the MS 510 performs the normal ranging (and the UL beam selection at the same time).

The DL Beam Selection=1 and the UL Beam Selection=1 signify that the MS requests both of the DL beam selection and the UL beam selection. Since the beam information of the MS is old and invalid, it is necessary to select a new beam.

Hence, similarly to the DL Beam Selection=0 and the UL Beam Selection=1, when the Dedicated Ranging=1, the corresponding neighboring BSs 530 and 540 allocate the dedicated resource (Dedicated Ranging Code/Dedicated Ranging Opportunity) to the MS 510 and the MS 510 performs the ranging (and the UL beam selection at the same time) using the resource. By contrast, when the Dedicated Ranging=0, the BS does not allocate the dedicated resource to the MS and thus the MS performs the normal ranging (and the UL beam selection at the same time).

Figure 6:
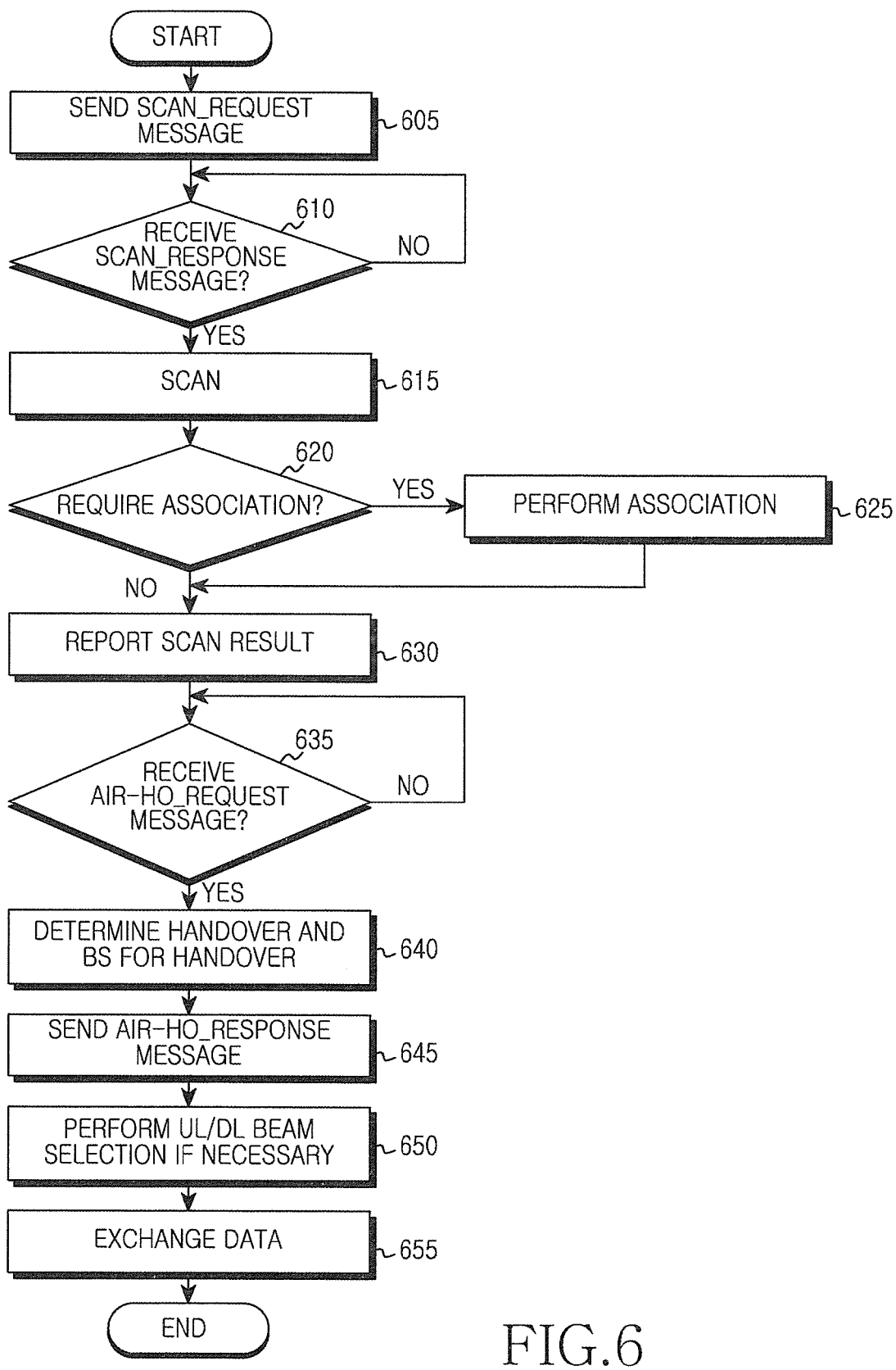
FIG. 6 illustrates operations of a mobile station according to an exemplary embodiment of the present disclosure.

FIG. 6 illustrates a flowchart of operations of the MS according to an exemplary embodiment of the present disclosure.

Referring to FIG. 6, the MS sends the Scan_Request message to the serving BS in step 605, receives the Scan_Response message from the serving BS in step 610, and determines whether and how to perform the scanning and the Association.

In step 615, the MS scans the serving BS and/or the neighboring BS. When negotiating about the Association in the Scan_Request/Scan_Response message negotiation in step 620, the MS performs the Association in step 625.

Next, the MS reports the scan result to the serving BS in step 630.

The scanning is performed based on the Scan_Request/Scan_Response message negotiation, the MS scans several BSs including the serving BS during the set time interval, and reports the scan result to the serving BS over the interleaving interval. The Scan_Request/Scan_Response messages include the parameter Scanning Type indicating whether to conduct only the Scanning, or both of the Scanning and the Association. The scanning period is determined by the parameter Scanning iteration. That is, the Scanning iteration indicates how many times the scanning is repeated and how many times (scanning duration+interleaving interval) is iterated. The MS can obtain the Dedicated Ranging Code added by the serving BS to the Scan_Response message and received from the neighboring BS, and use the Dedicated Ranging Code to select the UL beam with the neighboring BS.

The MS can determine the best DL Tx and Rx beams and UL Tx and Rx beams of the serving BS and the neighboring BS through the Scanning and the Association.

When receiving the Air-HO_Request message from the serving BS in step 635, the MS determines whether to conduct the handover, and the neighboring BS for the handover based on the parameters of the Air-HO_Request message in step 640.

In step 645, the MS sends the Air-HO_Response message including the information about whether to conduct the handover and the neighboring BS for the handover, to the serving BS.

The MS performs, if necessary, the UL and/or DL beam selection with the determined BS based on the parameters of the Air-HO_Request message in step 650 and exchanges the data in step 655.

Figure 7:
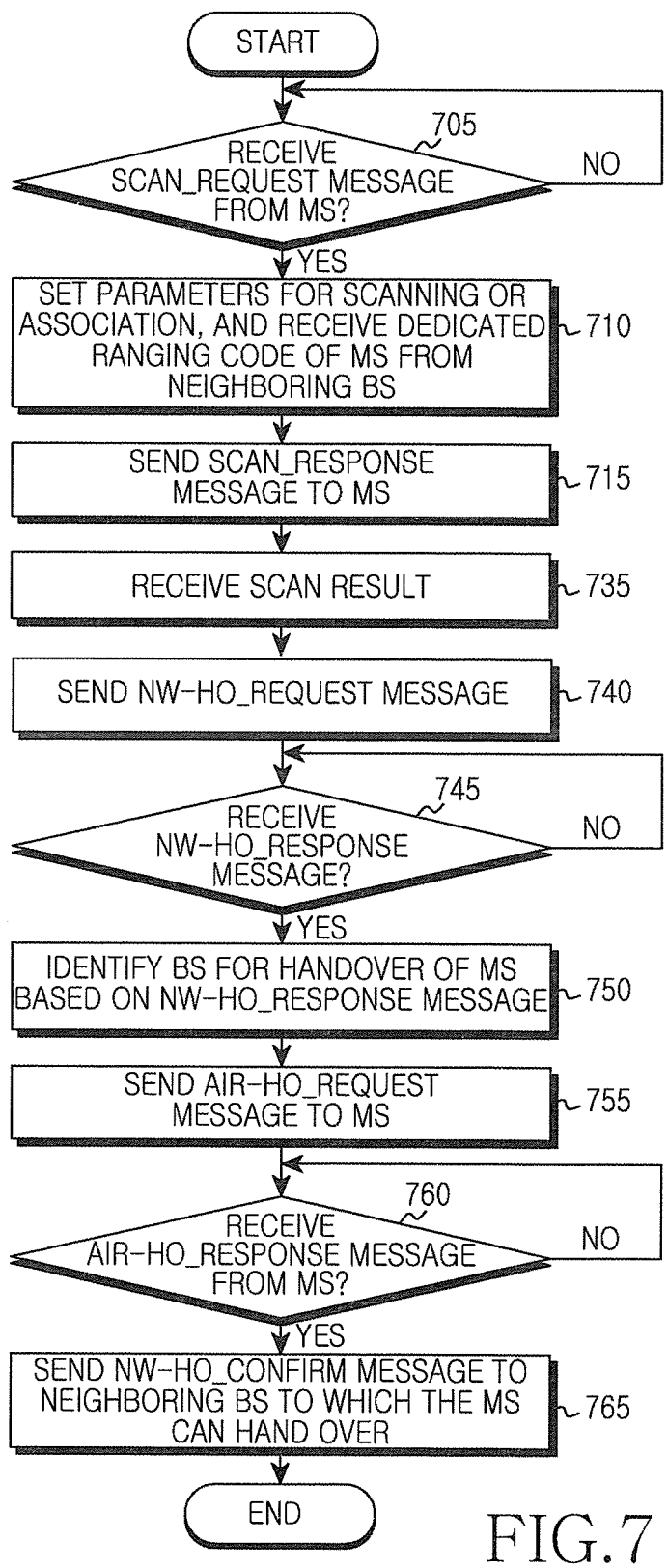
FIG. 7 illustrates operations of a serving base station according to an exemplary embodiment of the present disclosure.

FIG. 7 illustrates a flowchart of operations of the serving BS according to an exemplary embodiment of the present disclosure.

Referring to FIG. 7, when receiving the Scan_Request message from the MS in step 705, the serving BS sets the parameters for the Scanning or the Association and receives the Dedicated Ranging Code of the MS from the neighboring BS in the Association negotiation with the neighboring BS in step 710.

In step 715, the serving BS sends the Scan_Response message including the parameters to the MS. Next, the MS performs the Scanning and/or the Association.

In step 735, the serving BS receives the Scan_Report from the MS. The BS can determine the best DL Tx and Rx beams and UL Tx and Rx beams to the MS through the Scanning and the Association.

In step 740, the serving BS sends the NW-HO_Request message to the neighboring MS. The NW-HO_Request message includes the MSID, the DL beam ID, and the UL beam ID to be used by the MS For the neighboring BS.

When receiving the NW-HO_Response message from the neighboring BS in step 745, the serving BS identifies the BS to which the MS can hand over, based on the parameters of the NW-HO_Response message in step 750.

In step 755, the serving BS sends the Air-HO_Request message. The Air-HO_Request message includes the ID of the BS to which the MS can hand over, and the information about whether the UL and DL beam selections are conducted for the BS.

Upon receiving the Air-HO_Response message from the MS in step 760, the serving BS identifies whether the MS can hand over and the BS for the handover of the MS in the Air-HO_Response message.

The serving BS sends the NW-HO_Confirm message including a list of BSs allowing the handover of the MS to the neighboring BS which can support the handover of the MS in step 765.

Figure 8:
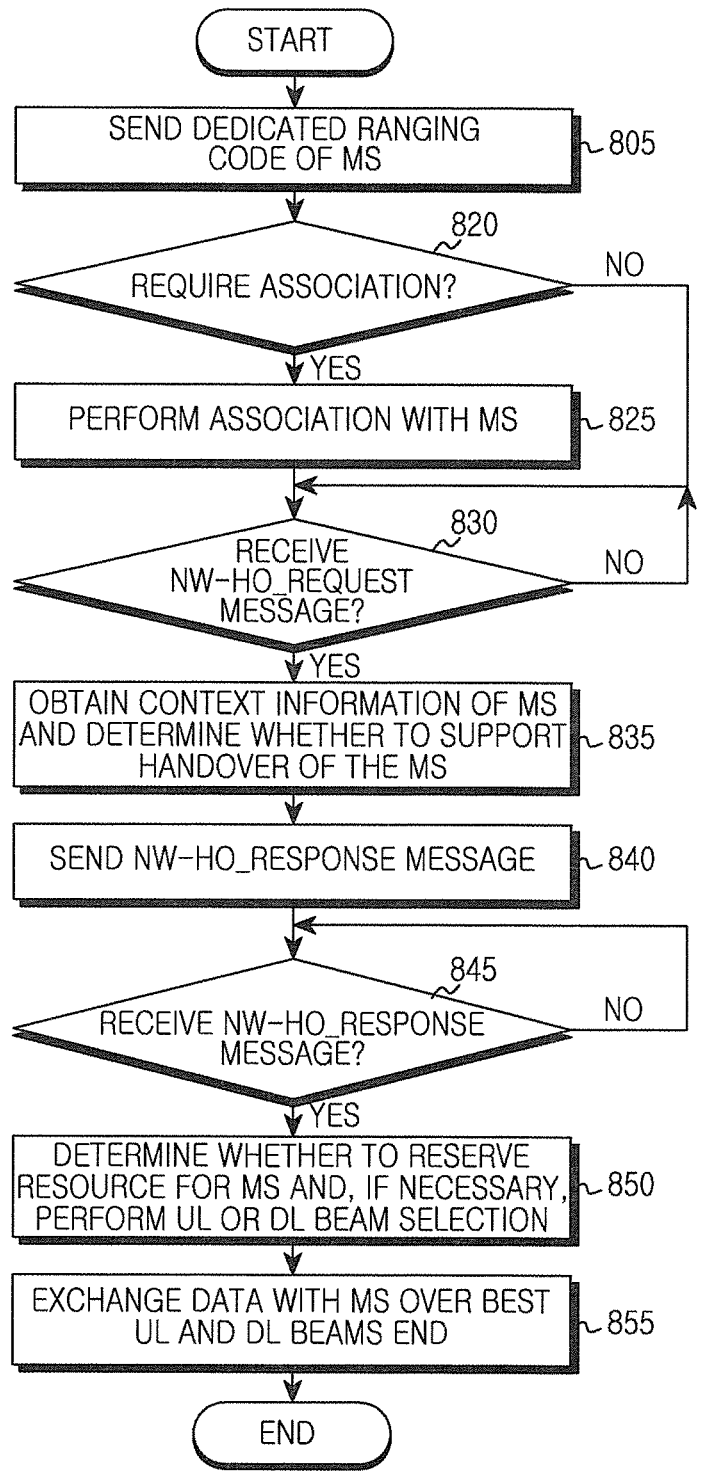
FIG. 8 illustrates operations of a neighboring base station according to an exemplary embodiment of the present disclosure.

FIG. 8 illustrates a flowchart of operations of the neighboring BS according to an exemplary embodiment of the present disclosure.

Referring to FIG. 8, as negotiating with the serving BS about the Association, the neighboring, BS transmits the Dedicated Ranging Code of the corresponding MS to the serving BS in step 805. Later, the neighboring BS, receiving the Dedicated Ranging Code, can identify which MS performs the Association.

When the Association with the MS is required in step 820, the neighboring BS conducts the Association with the MS in step 825.

When receiving the NW-HO_Request message from the serving BS in step 830, the neighboring BS obtains the context information of the MS from the NW-HO_Request message and determines whether to support the handover of the MS and to select the DL/UL beams in step 835. The context information of the MS can include the MSID to be used by the MS for the neighboring BS, the DL beam ID, and the UL beam ID.

In step 840, the neighboring BS transmits to the serving BS the NW-HO_Response message including the information about whether the handover of the MS is supported and whether the DL/UL beams are selected.

When receiving the NW-HO_Confirm message from the serving BS, the neighboring BS determines whether to reserve the resource for the MS based on the parameters of the NW-HO_Confirm message, and, if necessary, performs the UL and/or UL beam selection with the MS in step 850.

In step 855, the neighboring BS exchanges data with the MS over the best UL and DL beams.

Figure 9:
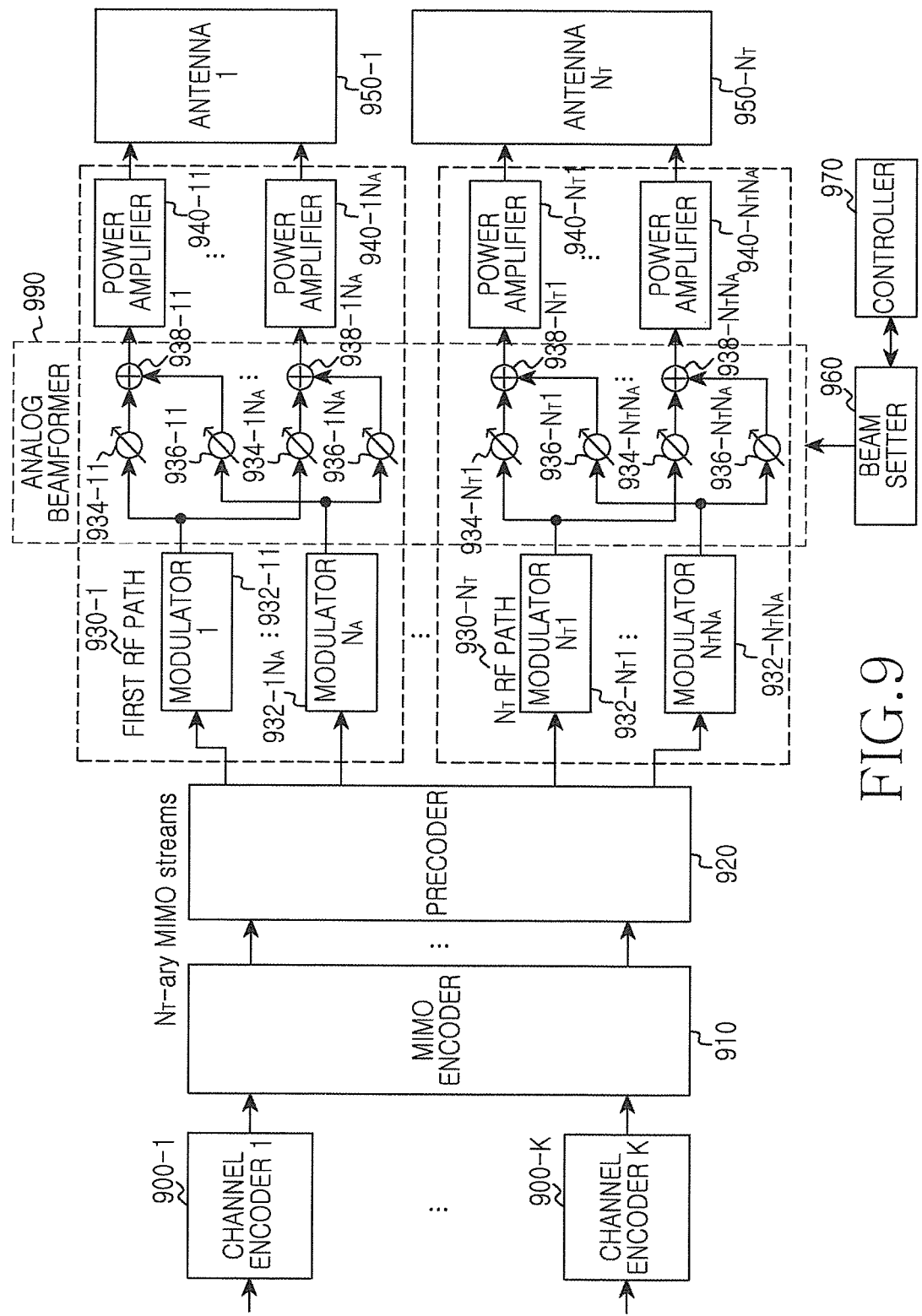
FIG. 9 illustrates a transmitting stage according to an exemplary embodiment of the present disclosure.

FIG. 9 illustrates a block diagram of a transmitting stage according to an exemplary embodiment of the present disclosure. Herein, the transmitting stage is assumed to adopt digital/analog hybrid beamforming, and can represent a transmitting stage of the MS and the BS.

Referring to FIG. 9, the transmitting stage includes K-ary channel encoders 900-1 through 900-K, a Multiple Input Multiple Output (MIMO) encoder 910, a precoder 920, $N_T$-ary Radio Frequency (RF) paths 930-1 through 930-$N_T$, $N_T$-ary antennas 950-1 through 950-$N_T$, a beam setter 960, and a controller 970.

The K-ary channel encoders 900-1 through 900-K each include a channel encoder and a modulator for encoding, modulating, and outputting the signal to transmit to a receiving stage.

The MIMO encoder 910 multiplexes the modulated signals fed from the K-ary channel encoders 900-1 through 900-K, to signals to transmit through $N_T$-ary streams in order to send them over the $N_T$-ary antennas 950-1 through 950-$N_T$.

The precoder 920 precodes the $N_T$-ary signals fed from the MIMO encoder 910 to precodes for the digital beamforming and provides the precodes to the RF paths 930-1 through 930-$N_T$ respectively.

The $N_T$-ary RF paths 930-1 through 930-$N_T$ each process the signals fed from the precoder 920 in order to output the signals through the corresponding antennas 950-1 through 950-$N_T$. In so doing, the $N_T$-ary RF paths 930-1 through 930-$N_T$ are constructed identically. Thus, the first RF path 930-1 is explained mainly here. The other $N_T$-ary RF paths 930-2 through 930-$N_T$ are constructed the same as the first RF path 930-1.

The first RF path 930-1 includes $N_A$-ary modulators 932-11 through 932-1$N_A$, an analog beamformer 990, and $N_A$-ary power amplifiers 940-11 through 940-1$N_A$. Herein, the $N_A$ denotes the number of antenna elements constituting the first antenna 950-1.

The $N_A$-ary modulators 932-11 through 932-1$N_A$ each modulate and output the signal fed from the precoder 920 according to a communication scheme. For example, the $N_A$-ary modulators 932-11 through 932-1$N_A$ each include an Inverse Fast Fourier Transform (IFFT) operator and a Digital to Analog Converter (DAC). The IFFT operator converts the signal output from the precoder 920 to a time-domain signal using IFFT. The DAC converts the time-domain signal output from the IFFT operator to an analog signal.

The analog beamformer 990 changes and outputs the Tx beam direction of the $N_A$-ary transmit signals output from the $N_A$-ary modulators 932-11 through 932-1$N_A$ according to the control signal indicating the Tx beam direction provided from the beam setter 960.

For example, the analog beamformer 990 includes a plurality of phase shifters 934-11 through 934-1$N_A$ and 936-11 through 936-1$N_A$, and combiners 938-11 through 938-1$N_A$. The $N_A$-ary modulators 932-11 through 932-1$N_A$ each split the output signal to $N_A$-ary signals and output them to the respective phase shifters 934-11 through 934-1$N_A$ and 936-11 through 936-1$N_A$. The phase shifters 934-11 through 934-1$N_A$ and 936-11 through 936-1$N_A$ change the phase of the signals output from the $N_A$-ary modulators 932-11 through 932-1$N_A$ according to the control signal indicating the Tx beam direction provided from the beam setter 960. The combiners 938-11 through 938-1$N_A$ combine the output signals of the phase shifters 934-11 through 934-1$N_A$ and 936-11 through 936-1$N_A$ corresponding to the antenna elements.

The power amplifiers 940-11 through 940-1$N_A$ each amplify the power of the signal output from the combiners 938-11 through 938-1$N_A$ and output the amplified signal to the outside through the first antenna 950-1.

The beam setter 960 selects the Tx beam direction to be used to transmit the signal, and provides the control signal according to the selected Tx beam direction to the analog beamformer 990 under control of the controller 970.

For example, the beam setter 960 provides the control signal according to the Tx beam direction for carrying the reference signal, the preamble/midamble, or the data, to the analog beamformer 990 under the control of the controller 970.

For example, the beam setter 960 selects the Tx beam direction for attaining the optimal transmission efficiency with the receiving stage by considering the channel information of the Tx beam directions provided from the MS under the control of the controller 970.

The controller 970 controls the beam setter 960 to select the Tx beam direction. For example, the controller 970 controls the beam setter 960 to send the reference signal or the data in the Tx beam directions supported by the transmitting stage.

For example, the controller 970 controls the beam setter 960 to select the optimal Tx beam direction by taking into account the channel information of the Tx beam direction provided from the receiving stage.

The transmitting stage may receive the optimal Tx beam direction selected by the receiving stage, from the receiving stage. In this case, the beam setter 960 provides the analog beamformer 990 with the control signal and the data according to the optimal Tx beam direction selected by the receiving stage.

The controller 970 of the transmitting stage can send a control message to the opponent node (e.g., the serving BS, the neighboring BS, or the MS).

Figure 10:
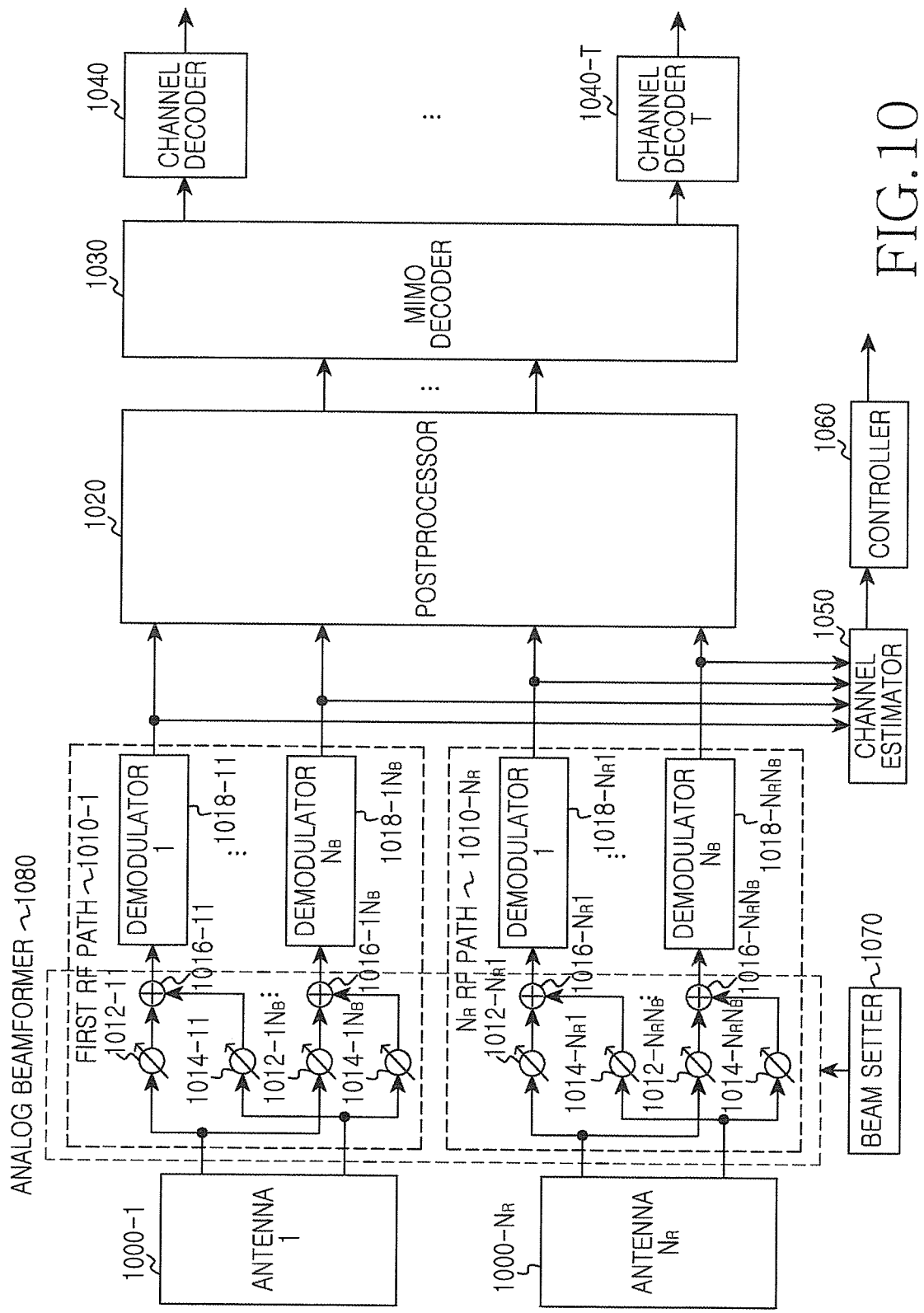
FIG. 10 illustrates a receiving stage according to an exemplary embodiment of the present disclosure.

FIG. 10 illustrates a block diagram of the receiving stage according to an exemplary embodiment of the present disclosure. Herein, the receiving stage is assumed to adopt the digital/analog hybrid beamforming, and can represent a receiving stage of the MS and the BS.

As shown in FIG. 10, the receiving stage includes $N_R$-ary antennas 1000-1 through 1000-$N_R$, $N_R$-ary RF paths 1010-1 through 1010-$N_R$, a postprocessor 1020, a MIMO decoder 1030, T-ary channel decoders 1040-1 through 1040-T, a channel estimator 1050, a controller 1060, and a beam setter 1070.

The $N_R$-ary RF paths 1010-1 through 1010-$N_R$ process the signals received via the corresponding antennas 1000-1 through 1000-$N_R$. The $N_R$-ary RF paths 1010-1 through 1010-$N_R$ are constructed identically. Accordingly, the structure of the first RF path 1010-1 is mainly described. The other RF paths 1010-2 through 1010-$N_R$ are constructed the same as the first RF path 1010-1.

The first RF path 1010-1 includes an analog beamformer 1080 and $N_B$-ary demodulators 1018-11 through 1018-1$N_B$. Herein, the $N_B$ denotes the number of antenna elements constituting the first antenna 1000-1.

The analog beamformer 1080 alters and outputs the direction of the $N_B$-ary receive signals output from the antenna elements of the first antenna 1000-1 according to the Tx beam direction provided from the beam setter 1070. For example, the analog beamformer 1080 includes a plurality of phase shifters 1012-11 through 1012-1$N_B$ and 1014-11 through 1014-1$N_B$, and combiners 1016-11 through 1016-1$N_B$. The antenna elements of the first antenna 1000-1 split the receive signal to $N_B$-ary signals and output them to the respective phase shifters 1012-11 through 1012-1$N_B$ and 1014-11 through 1014-1$N_B$. The phase shifters 1012-11 through 1012-1$N_B$ and 1014-11 through 1014-1$N_B$ change the phase of the signals output from the antenna elements of the first antenna 1000-1 according to the Rx beam direction provided from the beam setter 1070. The combiners 1016-11 through 1016-1$N_B$ combine the output signals of the phase shifters 1012-11 through 1012-1$N_B$ and 1014-11 through 1014-1$N_B$ corresponding to the antenna elements.

The $N_B$-ary demodulators 1018-11 through 1018-1$N_B$ demodulate and output the received signals fed from the combiners 1016-11 through 1016-1$N_B$ according to the communication scheme. For example, the $N_B$-ary demodulators 1018-11 through 1018-1$N_B$ each include an Analog to Digital Converter (ADC) and a FFT operator. The ADC converts the receive signal fed from the combiners 1016-11 through 1016-1$N_B$ to a digital signal. The FFT operator converts the signal fed from the ADC to a frequency-domain signal using FFT.

The postprocessor 1020 post-decodes the signals fed from the $N_R$-ary RF paths 1010-1 through 1010-$N_R$ according to the precoding scheme of the transmitting stage, and provides the post-decoded signals to the MIMO decoder 1030.

The MIMO decoder 1030 multiplexes the $N_R$-ary receive signals output from the postprocessor 1020 to T-ary signals so that the T-ary channel decoders 1040-1 through 1040-T can decode the signals.

The T-ary channel decoders 1040-1 through 1040-T each include a demodulator and a channel decoder for demodulating and decoding the signal received from the transmitting stage.

The channel estimator 1050 estimates the channel information based on the reference signal transmitted from the transmitting stage in the Tx beam directions. When a scan event occurs, the channel estimator 1050 estimates the channel information of each Tx beam direction. Herein, the channel information includes at least one of the SNR, the CINR, and the RSSI.

The controller 1060 transmits the channel information of the Tx beam directions estimated by the channel estimator 1050, to the transmitting stage. For example, the controller 1060 transmits the channel information of the Tx beam directions of good channels status, to the transmitting stage.

For example, when the receiving stage supports the Rx beamforming, the controller 1060 can transmits the channel information of the Tx beam directions having the channel status per Rx beam direction exceeding a reference value, to the transmitting stage.

The controller 1060 may select the Tx beam direction for attaining the optimal transmission efficiency with the transmitting stage, by considering the channel information of the Tx beam directions estimated by the channel estimator 1050.

For example, the controller 1060 selects the Tx beam direction for attaining the optimal transmission efficiency with the transmitting stage, by considering the channel information of the Tx beam directions estimated by the channel estimator 1050.

When the transmitting stage and the receiving stage belong to the MS, they operate as follows.

The MS can confirm the Scanning or the Association by sending and receiving the Scan_Request/Scan_Response messages, carry out the Scanning or the Association, and send the result to the serving BS.

The MS determines the neighboring BS for the handover based on the parameters of the Air-HO_Request message and sends the result to the serving BS.

The MS can selectively perform the DL/UL beam selection for the handover BS based on the parameters of the Air-HO_Request message.

When the transmitting stage and the receiving stage belong to the BS, they operate as follows.

The serving BS determines whether to perform the Scanning or the Association of the MS by sending and receiving the Scan_Request/Scan_Response messages. The serving BS can receive the MS Dedicated Ranging Code from the neighboring BS.

The serving BS can identify the BS for supporting the handover of the MS by sending the NW-HO_Request message to the neighboring BS, and inform the MS of the BS supporting the MS handover using the Air-HO_Request message.

The serving BS, upon receiving the NW-HO_Response from the MS, can identify the BS to which the MS hands over and inform the neighboring BS whether the neighboring BS is the MS handover target BS.

When the transmitting stage and the receiving stage belong to the neighboring BS, the controller 970 operates as follows.

The neighboring BS sends the Dedicated Ranging Code of the MS to the serving BS. The neighboring BS can inform the serving BS whether the handover of the MS supported or not, by sending and receiving the NW-HO_Request message/NW-HO_Response message.

The neighboring BS can confirm the handover target BS of the MS based on the NW-HO_Confirm message, and prepare the handover of the MS.

The controller can function as the beam setter in FIGS. 9 and 10.

As set forth above, the beam selection is conducted in the scanning interval in advance, and the beam selection is omitted in the process of the handover using the stored DL/UL beam information. Therefore, the handover latency increase caused by the beam selection can be minimized.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for handover in a Mobile Station (MS) of a wireless communication system which adjusts a beam direction, the method comprising:
   sending a scan request message for scanning a downlink (DL) beam or a DL beam and uplink (UL) beam with respect to a serving base station (BS) and a neighboring BS, to the serving BS;
   receiving a scan response message;
   performing scanning or the scanning and association with the serving BS and the neighboring BS based on the scan response message;
   determining the DL beam or the DL beam and UL beam for the MS based on a result of the scanning or the scanning and association; and
   after a handover from the serving BS to the neighboring BS, transmitting and receiving data to and from the neighboring BS based on the DL beam or the DL beam and UL beam.

2. The method of claim 1, further comprising:
   sending a scan report message comprising the result of the scanning or the scanning and the association to the serving BS; and
   when receiving an air handover (HO) request message from the serving BS, generating an air-HO response message comprising information of the neighboring handover BS to which the MS hands over based on the air-HO request message.

3. The method of claim 1, wherein performing the scanning comprises performing coarse beam selection, or the coarse beam selection and fine beam selection between the MS and the serving BS or between the MS and the neighboring BS, storing a result, and determining the DL Tx beam and the DL Rx beam.

4. The method of claim 1, wherein performing the association comprises performing ranging between the MS and the serving BS or between the MS and the neighboring BS, stores a result by performing UL coarse beam selection, and determining the UL Tx beam of the MS or the UL Rx beam of the serving BS or the neighboring BS.

5. The method of claim 2, wherein the air-HO request message comprises at least one of at least one base station identifier (BSID) indicating an identifier of the neighboring handover BS to which the MS hands over, DL beam selection indicating whether the MS performs the DL beam selection on the corresponding neighboring BS, UL beam selection indicating whether to perform the UL beam selection when the MS hands over to the corresponding neighboring BS, dedicated ranging used when the UL beam selection is set and the corresponding neighboring BS allocates a dedicated ranging code or a dedicated ranging opportunity for fast handover of the MS, action time indicating a time for using the dedicated ranging code when the dedicated ranging is set, and indicating a time for transmitting and receiving actual data when the DL beam selection is not set and the UL beam selection is not set, dedicated ranging code contained when the dedicated ranging is set, period for dedicated ranging code contained when the dedicated ranging is set and indicating a valid time of the dedicated ranging code to be used by the MS, and dedicated random access channel (RACH) Pattern identifier indicating an index of a scheduling pattern of dedicated RACH ranging opportunity allocated by the BS to the corresponding MS when the dedicated ranging is set.

6. The method of claim 2, wherein the air-HO response message comprises at least one of confirmation code indicating whether to permit a handover request using the air-HO request of the BS, base station identifiers (BSIDs) indicating an identifier of at least one BS which determines the handover of the MS, and last sequence numbers (SNs) indicating a sequence number of a last packet successfully used per service flow of the MS and provided as many as the service flows of the MS.

7. The method of claim 2, wherein the scan request and scan response messages comprise at least one of scanning type indicating whether the scanning only is performed or and the scanning and the association both are performed, scanning iteration indicating how many times the scanning which comprises scanning duration indicating a scanning interval and an interleaving interval between the scanning durations is repeated, scanning metric indicating a measurement metric of the scanning, scanning report type indicating a scanning report type comprising periodic reporting or event-driven reporting in case of an event, report period indicating a report period when the scanning reporting type is set to the Periodic reporting, report condition indicating a report condition when the scanning reporting type is set to the Event-driven Reporting, a base station identifier (BSID) indicating an identifier of a BS, dedicated ranging code to be used by the MS in the BS having the BSID in the process of the association, dedicated ranging opportunity indicating an opportunity of the MS for transmitting the dedicated ranging code, and period for dedicated ranging code indicating a valid time of the ranging rode.

8. The method of claim 2, further comprising:
performing beam selection with the neighboring handover BS based on the air-HO request message.

9. The method of claim 8, wherein performing the beam selection with the neighboring BS of the handover comprises:
selecting a beam with the BS determined for the handover according to a parameter of the air-HO request message.

10. A method for handover in a serving Base Station (BS) of a wireless communication system which adjusts a beam direction, the method comprising:
receiving a scan request message for scanning a downlink (DL) beam or a DL beam and uplink (UL) beam for a mobile station (MS), from the MS;
sending a scan response message comprising information about whether to perform scanning or scanning and association, to the MS;
receiving from the MS a scan report message comprising information of the DL beam or the DL beam and UL beam for the MS and a result of the scanning or the scanning and association; and
performing a handover from the serving BS to a neighboring BS, wherein after the handover, the MS is configured to transmit and receive data to and from the neighboring BS based on the DL beam or the DL beam and UL beam.

11. The method of claim 10, wherein performing the association comprises performing ranging between the MS and the serving BS or between the MS and the neighboring BS, storing a result by performing UL coarse beam selection, and determining the UL Tx beam of the MS or the UL Rx beam of the serving BS or the neighboring BS.

12. The method of claim 10, wherein the NW-HO request message comprises at least one of a mobile station identifier (MSID) indicating an identifier of the MS to hand over, DL beam identifier indicating the DL Tx beam to be used by the neighboring BS to transmit data to the MS after the handover of the MS is completed, and UL Beam identifier indicating the UL Rx beam to be used by the neighboring BS to receive data from the MS after the handover of the MS is completed,
wherein the UL Beam identifier is contained when the MS and the neighboring BS perform the association.

13. The method of claim 10, further comprising:
receiving a dedicated ranging code of the MS from the neighboring BS through negotiation with the neighboring BS;
sending a network handover (NW-HO) request message to the neighboring BS based on the scan response message in order to identify a BS capable of supporting handover of the MS and to share context of the MS;
receiving a NW-HO response message comprising information indicating whether the handover of the MS is supportable, from the neighboring BS;
sending an air-HO request message to the MS based on the NW-HO response message, and receiving an air-HO response message comprising information indicating whether the MS is able to hand over and information of the neighboring BS to which the MS hands over; and
sending a NW-HO confirm message informing whether the handover of the MS is performed, to the neighboring BS which sends the NW-HO request message based on the air-HO response message.

14. The method of claim 13, wherein the air-HO_Request message comprises at least one of at least one base station identifier (BSID) indicating an identifier of the neighboring BS to which the MS hands over, DL beam selection indicating whether the MS performs the DL beam selection on the corresponding neighboring BS, UL beam selection indicating whether to perform the UL beam selection when the MS hands over to the corresponding neighboring BS, dedicated ranging used when the UL beam selection is set and the corresponding neighboring BS allocates a dedicated ranging code or a dedicated ranging opportunity for fast handover of the MS, action time indicating a time for using the dedicated ranging code when the dedicated ranging is set, and indicating a time for transmitting and receiving actual data when the DL beam selection is not set and the UL beam selection is not set, dedicated ranging code contained when the dedicated ranging is set, period for dedicated ranging code contained when the dedicated ranging is set and indicating a valid time of the dedicated ranging code to be used by the MS, and dedicated random access channel (RACH) pattern identifier indicating an index of a scheduling pattern of dedicated RACH ranging opportunity allocated by the BS to the MS when the dedicated ranging is set.

15. The method of claim 13, wherein the air-HO response message comprises at least one of confirmation code indicating whether to permit a handover request using the air-HO request of the BS, base station identifiers (BSIDs) indicating an identifier of at least one BS which determines the handover of the MS, and last sequence numbers (SNs) indicating a sequence number of a last packet successfully used per service flow of the MS and provided as many as the service flows of the MS.

16. The method of claim 13, wherein the NW-HO confirm message comprises at least one of a mobile station identifier (MSID) indicating an identifier of the MS, a base station identifier (BSID) indicating an identifier of the neighboring BS which the MS determines to hand over to, and last sequence numbers (SNs) indicating a sequence number of a last packet successfully used per service flow of the MS and provided as many as the service flows of the MS.

17. The method of claim 13, wherein the NW-HO response message comprises at least one of a mobile station identifier (MSID) indicating an identifier of the MS to hand over, DL beam selection indicating whether the MS performs DL beam selection for the neighboring BS, UL beam selection indicating whether to perform UL beam selection when the MS hands over to the neighboring BS, dedicated ranging used when the UL beam selection is set and the corresponding neighboring BS allocates a dedicated ranging code or a dedicated ranging opportunity for fast handover of the MS, action time indicating a time for using the dedicated ranging code when the dedicated ranging is set, and indicating a time for transmitting and receiving actual data when the DL beam selection is not set and the UL beam selection is not set, dedicated ranging code contained when the dedicated ranging is set, period for dedicated ranging code contained when the dedicated ranging is set and indicating a valid time of the dedicated ranging code to be used by the MS, and dedicated random access channel (RACH) pattern identifier indicating an index of a scheduling pattern of dedicated RACH ranging opportunity allocated by the BS to the corresponding MS when the dedicated ranging is set.

18. The method of claim 10, wherein the scan request and scan response messages comprise at least one of scanning type indicating whether the scanning only is performed or and the scanning and the association both are performed, scanning iteration indicating how many times the scanning which comprises scanning duration indicating a scanning interval and an interleaving interval between the scanning durations is repeated, scanning metric indicating a measurement metric of the scanning, scanning report type indicating a scanning report type comprising periodic reporting or event-driven reporting in case of an event, report period indicating a report period when the scanning reporting type is set to the periodic reporting, report condition indicating a report condition when the scanning reporting type is set to the event-driven reporting, a base station identifier (BSID) indicating an identifier of a BS, dedicated ranging code to be used by the MS in the BS having the BSID in the process of the association, dedicated ranging opportunity indicating an opportunity of the MS for transmitting the dedicated ranging code, and period for dedicated ranging code indicating a valid time of the ranging code.

19. The method of claim 10, wherein performing the scanning comprises performing coarse beam selection, or the coarse beam selection and fine beam selection between the MS and the serving BS or between the MS and the neighboring BS, storing a result, and determining the DL Tx beam and the DL Rx beam.

20. A method for handover in a neighboring base station (BS) of a wireless communication system which adjusts a beam direction, the method comprising:
performing scanning or scanning and association with a mobile station (MS) to scan a downlink (DL) beam or DL beam and uplink (UL) beam for the MS;
receiving from the serving BS a network handover (NW-HO) request message based on a scan response message comprising a result of the scanning or the scanning and association of the MS and information of the DL beam or the DL beam and UL beam determined by the MS; and
after a handover from the serving BS to the neighboring BS, transmitting and receiving data to and from the MS based on the DL beam or the DL beam and UL beam.

21. The method of claim 20, wherein performing the scanning comprises performing coarse beam selection, or the coarse beam selection and fine beam selection between the MS and the serving BS or between the MS and the neighboring BS, storing a result, and determining the DL Tx beam and the DL Rx beam.

22. The method of claim 20, wherein performing the association comprises performing ranging between the MS and the serving BS or between the MS and the neighboring BS, storing a result by performing UL coarse beam selection, and determining the UL Tx beam of the MS or the UL Rx beam of the serving BS or the neighboring BS.

23. The method of claim 20, further comprising:
sending a dedicated ranging code of the MS to the serving BS through negotiation with the serving BS;
generating and sending a NW-HO response message comprising information indicating whether the handover of the MS is supportable, to the serving BS; and
receiving from the serving BS a NW-HO confirm message informing whether the handover of the MS is performed, to the neighboring BS which sends the NW-HO request message based on the air-HO response message.

24. The method of claim 23, wherein the NW-HO request message comprises at least one of mobile station identifier indicating an identifier of the MS to hand over, DL beam identifier indicating the DL Tx beam to be used by the neighboring BS to transmit data to the MS after the handover of the MS is completed, and UL beam identifier indicating the UL Rx beam to be used by the corresponding neighboring BS to receive data from the MS after the handover of the MS is completed, wherein the handover of the MS is a network re-entry,
wherein the UL beam identifier is contained when the MS and the BS perform the association.

25. The method of claim 23, wherein the NW-HO response message comprises at least one of a mobile station identifier indicating the identifier of the MS to hand over, DL beam selection indicating whether the MS performs DL beam selection for the neighboring BS, UL beam selection indicating whether to perform UL beam selection when the MS hands over to the neighboring BS, dedicated ranging used when the UL beam selection is set and the neighboring BS allocates a dedicated ranging code or a dedicated ranging opportunity for fast handover of the MS, action time indicating a time for using the dedicated ranging code when the dedicated ranging is set, and indicating a time for transmitting and receiving actual data when the DL beam selection is not set and the UL beam selection is not set, dedicated ranging code contained when the dedicated ranging is set, period for dedicated ranging code contained when the dedicated ranging is set and indicating a valid time of the dedicated ranging code to be used by the MS, and dedicated random access channel pattern identifier indicating an index of a scheduling pattern of dedicated random access channel ranging opportunity allocated by the BS to the corresponding MS when the dedicated ranging is set.

26. The method of claim 23, wherein the NW-HO confirm message comprises at least one of mobile station identifier indicating the identifier of the MS, base station identifier indicating the identifier of the BS which the MS determines to hand over to, and last sequence number (SNs) indicating a sequence number of a last packet successfully used per service flow of the MS and provided as many as service flows of the MS.

27. The method of claim 23, further comprising:
performing beam selection with the MS based on the NW-HO confirm message.

28. An apparatus of a mobile station (MS) for handover in a wireless communication system which adjusts a beam direction, the apparatus comprising:
a transmitter configured to send a scan request message for scanning a downlink (DL) beam or a DL beam and uplink (UL) beam with respect to a serving base station (BS) and a neighboring BS, to the serving BS;
a receiver configured to scan a response message; and
a controller configured to perform scanning or scanning and association with the serving BS and the neighboring BS based on the scan response message, determine the DL beam or the DL beam and UL beam for the MS based on a result of the scanning or the scanning and association, and after a handover from the serving BS to the neighboring BS, transmit and receive data to and from the neighboring BS based on the DL beam or the DL beam and UL beam.

29. The apparatus of claim 28, wherein the controller is configured to send a scan report message comprising the result of the scanning or the scanning and the association to the serving BS, and to generate, when receiving an air handover (HO) request message from the serving BS, an air-HO response message comprising information of the neighboring BS to which the MS hands over, based on the air-HO request message.

30. The apparatus of claim 29, wherein the scan request and scan response messages comprise at least one of scanning type indicating whether the scanning only is performed or and the scanning and the association both are performed, scanning iteration indicating how many times the scanning which comprises scanning duration indicating a scanning interval and an interleaving interval between the scanning durations is repeated, scanning metric indicating a measurement metric of the scanning, scanning report type indicating a scanning report type comprising periodic reporting or event-driven reporting in case of an event, report period indicating a report period when the scanning reporting type is set to the periodic reporting, report condition indicating a report condition when the scanning reporting type is set to the event-driven reporting, base station identifier indicating an identifier of the BS, dedicated ranging code to be used by the MS in the BS having the base station identifier in the process of the association, dedicated ranging opportunity indicating an opportunity of the MS for transmitting the dedicated ranging code, and Period for dedicated ranging code indicating a valid time of the ranging code.

31. The apparatus of claim 29, wherein the air-HO request message comprises at least one of at least one base station identifier indicating the identifier of the BS to which the MS hands over, DL beam selection indicating whether the MS performs the DL beam selection on the corresponding neighboring BS, UL beam selection indicating whether to perform the UL beam selection when the MS hands over to the corresponding neighboring BS, dedicated ranging used when the UL beam selection is set and the corresponding neighboring BS allocates a dedicated ranging code or a dedicated ranging opportunity for fast handover of the MS, an action time indicating a time for using the dedicated ranging code when the dedicated ranging is set, and indicating a time for transmitting and receiving actual data when the DL beam selection is not set and the UL beam selection is not set, dedicated ranging code contained when the dedicated ranging is set, Period for dedicated ranging code contained when the dedicated ranging is set and indicating a valid time of the dedicated ranging code to be used by the MS, and dedicated random access channel pattern identifier indicating an index of a scheduling pattern of dedicated random access channel ranging opportunity allocated by the BS to the corresponding MS when the dedicated ranging is set.

32. The apparatus of claim 29, wherein the air-HO response message comprises at least one of confirmation code indicating whether to permit a handover request using the air-HO request of the BS, base station identifier(s) indicating the identifier of at least one BS which determines the handover of the MS, and last sequence numbers (SNs) indicating a sequence number of a last packet successfully used per service flow of the MS and provided as many as the service flows of the MS.

33. The apparatus of claim 29, wherein the controller is further configured to control to perform beam selection with the neighboring BS of the handover based on the air-HO request message.

34. The apparatus of claim 33, wherein, when performing the beam selection with the neighboring BS of the handover, the controller is configured to select a beam with the BS determined for the handover, according to a parameter of the air-HO request message.

35. The apparatus of claim 28, wherein the controller is configured to control to perform the scanning by performing coarse beam selection, or the coarse beam selection and fine beam selection between the MS and the serving BS or between the MS and the neighboring BS, store a result, and determine the DL Tx beam and the DL Rx beam.

36. The apparatus of claim 28, wherein the controller is configured to control to perform the association by performing ranging between the MS and the serving BS or between the MS and the neighboring BS, store a result by performing UL coarse beam selection, and determine the UL Tx beam of the MS or the UL Rx beam of the serving BS or the neighboring BS.

37. An apparatus of a serving base station (BS) for handover in a wireless communication system which adjusts a beam direction, the apparatus comprising:
at least one antenna comprising a plurality of antenna elements;
a receiver configured to scan a request message for scanning a downlink (DL) beam or a DL beam and uplink (UL) beam for a mobile station (MS), and a scan report message comprising information of the DL beam or the DL beam and UL beam for the MS and a result of scanning or scanning and association, from the MS;
a transmitter configured to send a scan response message comprising information about whether to perform the scanning or the scanning and association, to the MS; and
a controller configured to perform a handover from the serving BS to a neighboring BS,
wherein after the handover, the MS is configured to transmit and receive data to and from the neighboring BS based on the DL beam or the DL beam and UL beam.

38. The apparatus of claim 37, wherein the controller is configured to receive a scan request message for scanning the DL beam or the DL beam and UL beam with respect to the MS, from the MS, receive a dedicated ranging code of the MS from a neighboring BS through negotiation with the neighboring BS, to the MS, sends a network-handover (NW-HO) request message to at least one neighboring BS based on the scan response message in order to identify a BS capable of supporting handover of the MS and to share context of the MS, receives a NW-HO response message comprising information indicating whether the handover of the MS is supportable, from the at least one neighboring BS, send an air-HO request message to the MS based on the NW-HO response message, receive an air-HO response message comprising information indicating whether the MS is able to hand over and information of at least one neighboring BS to which the MS hands over, and send a NW-HO confirm message informing whether the handover of the MS is performed, to the neighboring BS which sends the NW-HO request message based on the air-HO response message.

39. The apparatus of claim 38, wherein the controller is configured to control to perform the scanning by performing coarse beam selection, or the coarse beam selection and fine beam selection between the MS and the serving BS or between the MS and the neighboring BS, store a result, and determine the DL Tx beam and the DL Rx beam.

40. The apparatus of claim 38, wherein the controller is configured to control to perform the association by performing ranging between the MS and the serving BS or between the MS and the neighboring BS, stores a result by performing UL coarse beam selection, and determine the UL Tx beam of the MS or the UL Rx beam of the serving BS or the neighboring BS.

41. The apparatus of claim 38, wherein the NW-HO request message comprises at least one of mobile station identifier indicating an identifier of the MS to hand over, DL beam identifier indicating the DL Tx beam to be used by the neighboring BS to transmit data to the MS after the handover of the MS is completed, and UL beam identifier indicating the UL Rx beam to be used by the neighboring BS to receive data from the MS after the handover of the MS is completed,
wherein the UL beam identifier is contained when the MS and the corresponding BS perform the association.

42. The apparatus of claim 38, wherein the NW-HO response message comprises at least one of mobile station identifier indicating the identifier of the MS to hand over, DL beam selection indicating whether the MS performs DL beam selection for the corresponding neighboring BS, UL beam selection indicating whether to perform UL beam selection when the MS hands over to the corresponding neighboring BS, dedicated ranging used when the UL beam selection is set and the corresponding neighboring BS allocates a dedicated ranging code or a dedicated ranging opportunity for fast handover of the MS, action time indicating a time for using the dedicated ranging code when the dedicated ranging is set, and indicating a time for transmitting and receiving actual data when the DL beam selection is not set and the UL beam selection is not set, dedicated ranging code contained when the dedicated ranging is set, Period for dedicated ranging code contained when the dedicated ranging is set and indicating a valid time of the dedicated ranging code to be used by the MS, and dedicated random access channel pattern identifier indicating an index of a scheduling pattern of dedicated random access channel ranging opportunity allocated by the BS to the corresponding MS when the dedicated ranging is set.

43. The apparatus of claim 38, wherein the air-HO request message comprises at least one of at least one base station identifier indicating the identifier of the BS to which the MS hands over, DL beam selection indicating whether the MS performs the DL beam selection on the corresponding neighboring BS, UL beam selection indicating whether to perform the UL beam selection when the MS hands over to the corresponding neighboring BS, dedicated ranging used when the UL beam selection is set and the corresponding neighboring BS allocates a dedicated ranging code or a dedicated ranging opportunity for fast handover of the MS, action time indicating a time for using the dedicated ranging code when the dedicated ranging is set, and indicating a time for transmitting and receiving actual data when the DL beam selection is not set and the UL beam selection is not set, dedicated ranging code contained when the dedicated ranging is set, Period for dedicated ranging code contained when the dedicated ranging is set and indicating a valid time of the dedicated ranging code to be used by the MS, and dedicated random access channel pattern identifier indicating an index of a scheduling pattern of dedicated random access channel ranging opportunity allocated by the BS to the corresponding MS when the dedicated ranging is set.

44. The apparatus of claim 38, wherein the air-HO response message comprises at least one of confirmation code indicating whether to permit a handover request using the air-HO request of the BS, base station identifier(s) indicating the identifier of at least one BS which determines the handover of the MS, and last sequence numbers (SNs) indicating a sequence number of a last packet successfully used per service flow of the MS and provided as many as the service flows of the MS.

45. The apparatus of claim 38, wherein the NW-HO confirm message comprises at least one of mobile station identifier indicating the identifier of the MS, base station identifier indicating the identifier of the BS which the MS determines to hand over to, and last sequence number (SNs) indicating a sequence number of a last packet successfully used per service flow of the MS and provided as many as the service flows of the MS.

46. The apparatus of claim 37, wherein the scan request and scan response messages comprise at least one of scanning type indicating whether the scanning only is performed or and the scanning and the association both are performed, scanning iteration indicating how many times the scanning which comprises scanning duration indicating a scanning interval and an interleaving interval between the scanning durations is repeated, scanning metric indicating a measurement metric of the scanning, scanning report type indicating a scanning report type comprising periodic reporting or event-driven reporting in case of an event, report period indicating a report period when the scanning reporting type is set to the periodic reporting, report condition indicating a report condition when the scanning reporting type is set to the event-driven reporting, base station identifier indicating an identifier of the BS, dedicated ranging code to be used by the MS in the BS having the base station identifier in the process of the association, dedicated ranging opportunity indicating an opportunity of the MS for transmitting the dedicated ranging code, and period for dedicated ranging code indicating a valid time of the ranging code.

47. An apparatus of a neighboring base station (BS) for handover in a wireless communication system which adjusts a beam direction, the apparatus comprising:
at least one antenna comprising a plurality of antenna elements;
a transmitter;
a receiver; and
a controller,
wherein the controller is configured to perform scanning or scanning and association with a mobile station (MS) to scan a downlink (DL) beam or DL beam and uplink (UL) beam for the MS,
wherein the receiver is configured to receive from the serving BS a network handover (NW-HO) request message based on a scan response message comprising a result of the scanning or the scanning and association of the MS and information of the DL beam or the DL beam and UL beam determined by the MS; and wherein the transmitter and the receiver, after a handover from the serving BS to the neighboring BS, are configured to transmit and receive data to and from the MS based on the DL beam or the DL beam and UL beam.

48. The apparatus of claim 47, wherein the controller is further configured to send a dedicated ranging code of the MS to the serving BS through negotiation with the serving BS, generate and send a NW-HO response message comprising information indicating whether handover of the MS is supportable, to the serving BS, and receive from the serving BS a NW-HO confirm message informing whether the handover of the MS is performed, to the neighboring BS which sends the NW-HO request message based on the air-HO response message.

49. The apparatus of claim 48, wherein the controller is configured to control to perform the scanning by performing coarse beam selection, or the coarse beam selection and fine beam selection between the MS and the serving BS or between the MS and the neighboring BS, store a result, and determine the DL Tx beam and the DL Rx beam.

50. The apparatus of claim 48, wherein the controller is configured to control to perform the association by performing ranging between the MS and the serving BS or between the MS and the neighboring BS, store a result by performing UL coarse beam selection, and determine the UL Tx beam of the MS or the UL Rx beam of the serving BS or the neighboring BS.

51. The apparatus of claim 48, wherein the NW-HO request message comprises at least one of mobile station identifier indicating an identifier of the MS to hand over, DL beam identifier indicating the DL Tx beam to be used by the corresponding neighboring BS to transmit data to the MS after the handover of the MS is completed, and UL beam identifier indicating the UL Rx beam to be used by the corresponding neighboring BS to receive data from the MS after the handover of the MS is completed, wherein the handover of the MS is a network re-entry, wherein the UL beam identifier is contained when the MS and the corresponding BS perform the association.

52. The apparatus of claim 48, wherein the NW-HO response message comprises at least one of mobile station identifier indicating an identifier of the MS to hand over, DL beam selection indicating whether the MS performs DL beam selection for the corresponding neighboring BS, UL beam selection indicating whether to perform UL beam selection when the MS hands over to the corresponding neighboring BS, dedicated ranging used when the UL beam selection is set and the corresponding neighboring BS allocates a dedicated ranging code or a dedicated ranging opportunity for fast handover of the MS, action time indicating a time for using the dedicated ranging code when the dedicated ranging is set, and indicating a time for transmitting and receiving actual data when the DL beam selection is not set and the UL beam selection is not set, dedicated ranging code contained when the dedicated ranging is set, period for dedicated ranging code contained when the dedicated ranging is set and indicating a valid time of the dedicated ranging code to be used by the MS, and dedicated random access channel pattern identifier indicating an index of a scheduling pattern of dedicated random access channel ranging opportunity allocated by the BS to the corresponding MS when the dedicated ranging is set.

53. The apparatus of claim 48, wherein the NW-HO confirm message comprises at least one of mobile station identifier indicating an identifier of the MS, base station identifier indicating the identifier of the BS which the MS determines to hand over to, and last sequence numbers (SNs) indicating a sequence number of a last packet successfully used per service flow of the MS and provided as many as the service flows of the MS.

54. The apparatus of claim 48, wherein the controller is further configured to perform beam selection with the MS based on the NW-HO confirm message.

* * * * *